United States Patent
Guan

(10) Patent No.: US 11,088,778 B2
(45) Date of Patent: Aug. 10, 2021

(54) INFORMATION TRANSMISSION METHOD AND APPARATUS

(71) Applicant: Huawei Technologies Co., Ltd., Shenzhen (CN)

(72) Inventor: Peng Guan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/580,884

(22) Filed: Sep. 24, 2019

(65) Prior Publication Data

US 2020/0021389 A1  Jan. 16, 2020

Related U.S. Application Data

(63) Continuation of application No. PCT/CN2018/080116, filed on Mar. 23, 2018.

(30) Foreign Application Priority Data

Mar. 24, 2017 (CN) .......................... 201710184780.3
Mar. 30, 2017 (CN) .......................... 201710204289.2

(51) Int. Cl.
*H04W 4/00* (2018.01)
*H04L 1/00* (2006.01)
*H04L 5/00* (2006.01)

(52) U.S. Cl.
CPC ............ *H04L 1/0013* (2013.01); *H04L 1/001* (2013.01); *H04L 1/0033* (2013.01); *H04L 5/0005* (2013.01)

(58) Field of Classification Search
CPC ..... H04L 1/0013; H04L 1/001; H04L 1/0033; H04L 5/0005; H04L 5/0053;

(Continued)

(56) References Cited

U.S. PATENT DOCUMENTS

2002/0027956 A1* 3/2002 Lee ........................ H04L 1/1841
375/262
2003/0138059 A1* 7/2003 Xu ........................ H04L 1/1819
375/316

(Continued)

FOREIGN PATENT DOCUMENTS

CN  101141166 A  3/2008
CN  101374340 A  2/2009

(Continued)

OTHER PUBLICATIONS

"On QCL, Rate Matching and DCI Signalling for Aperiodic CSI-RS," 3GPP TSG RAN WG1 Meeting #87, Reno, USA, R1-1611282, pp. 1-4, 3rd Generation Partnership Project, Valbonne, France (Nov. 14-18, 2016).

(Continued)

*Primary Examiner* — Atique Ahmed
(74) *Attorney, Agent, or Firm* — Leydig, Voit & Mayer, Ltd.

(57) ABSTRACT

Embodiments of this application disclose an information transmission method and apparatus, and relate to the field of communications technologies. In this technical solution, impact of a beam on information transmission is taken into account, thereby improving robustness of a control channel. The method may include: performing rate matching on a first bit sequence based on beam indication information, to obtain a second bit sequence, where the first bit sequence is a bit sequence obtained by performing channel coding on an original bit sequence; mapping the second bit sequence onto a time-frequency resource; and sending, to a receive end by using a beam indicated by the beam indication information, the second bit sequence that is mapped onto the time-frequency resource.

16 Claims, 16 Drawing Sheets

(58) Field of Classification Search
CPC .. H04L 1/1812; H04W 72/042; H04W 76/27; H04W 72/0446
See application file for complete search history.

(56) References Cited

U.S. PATENT DOCUMENTS

| | | | |
|---|---|---|---|
| 2007/0189240 A1* | 8/2007 | Cho | H04L 5/0051 370/337 |
| 2012/0257664 A1* | 10/2012 | Yue | H04L 1/0035 375/227 |
| 2014/0328435 A1* | 11/2014 | You | H04L 1/0625 375/308 |
| 2016/0270038 A1 | 9/2016 | Papasakellariou | |
| 2017/0264464 A1* | 9/2017 | Shen | H04L 25/00 |
| 2017/0331577 A1* | 11/2017 | Parkvall | H04W 8/18 |
| 2018/0131430 A1* | 5/2018 | Gao | H04W 72/042 |
| 2018/0192428 A1* | 7/2018 | Doostnejad | H04B 7/0452 |
| 2019/0036586 A1* | 1/2019 | Bradford | H04L 1/1861 |

FOREIGN PATENT DOCUMENTS

| | | |
|---|---|---|
| CN | 103188044 A | 7/2013 |
| WO | 2016089124 A1 | 6/2016 |
| WO | 2019101206 A1 | 5/2019 |

OTHER PUBLICATIONS

"On Rate Matching for Beamformed CSI-RS," 3GPP TSG-RAN WG1 #86bis, Lisbon, Portugal, R1-1609846, pp. 1-7, 3rd Generation Partnership Project, Valbonne, France (Oct. 10-14, 2016).

"3rd Generation Partnership Project;Technical Specification Group Radio Access Network;Evolved Universal Terrestrial Radio Access (E-UTRA); Physical channels and modulation (Release 12)," 3GPP TS 36.211 V12.4.0, pp. 1-124, 3rd Generation Partnership Project, Valbonne, France (Dec. 2014).

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.0.0, pp. 1-121, 3rd Generation Partnership Project, Valbonne, France (Dec. 2015).

"3rd Generation Partnership Project;Technical Specification Group Radio Access Network; Evolved Universal Terrestrial Radio Access (E-UTRA); Physical layer procedures (Release 13)," 3GPP TS 36.213 V13.0.0, pp. 1-326, 3rd Generation Partnership Project, Valbonne, France (Dec. 2015).

* cited by examiner

The base station obtains a second bit sequence according to a formula $e_k = w_{(j+k_0) \bmod K_w}$ — M1

INFORMATION TRANSMISSION METHOD AND APPARATUS

CROSS-REFERENCE TO RELATED APPLICATIONS

This application is a continuation of International Application No. PCT/CN2018/080116, filed on Mar. 23, 2018, which claims priority to Chinese Patent Application No. 201710204289.2, filed on Mar. 30, 2017, which claims priority to Chinese Patent Application No. 201710184780.3, filed on Mar. 24, 2017. The disclosures of the aforementioned applications are incorporated herein by reference in their entireties.

TECHNICAL FIELD

Embodiments of this application relate to the field of communications technology, and in particular, to an information transmission method and apparatus.

BACKGROUND

In a long term evolution (LTE) system, a procedure of processing a physical downlink control channel (PDCCH) at a physical layer by a base station includes: performing, by the base station, operations such as channel coding, rate matching, scrambling, modulation, cyclic shift, and resource mapping on an original data bit, and then sending out the processed data bit. This technical solution no longer meets a requirement of new radio (NR).

SUMMARY

This application provides an information transmission method and apparatus, to improve robustness of a control channel, with impact of a beam on rate matching taken into account.

To achieve the foregoing objective, the following technical solutions are used in this application:

According to a first aspect, this application provides a rate matching method, and the method may be performed by a transmit end. The method may include: performing rate matching on a first bit sequence based on beam indication information, to obtain a second bit sequence, where the first bit sequence is a bit sequence obtained by performing channel coding on an original data bit. In this technical solution, beams are taken into account in a process in which the rate matching operation is performed. In this way, bit sequences obtained by performing rate matching on PDCCHs sent on different beams may be different. In other words, versions of the PDCCHs transmitted on different beams may be different. In this way, performing soft combination on a user equipment (UE) side can increase a signal-to-noise ratio (SNR) and reduce a code rate, thereby improving robustness of a control channel.

It may be understood that if the second bit sequence is applied to a downlink transmission process, the method may be performed by a network device (for example, a base station). If the second bit sequence is applied to an uplink transmission process, the method may be performed by a terminal device (for example, a UE).

In an optional implementation, the performing rate matching on a first bit sequence based on beam indication information, to obtain a second bit sequence may include: determining an initial bit of the second bit sequence based on the beam indication information; and performing rate matching on the first bit sequence based on the initial bit of the second bit sequence, to determine the second bit sequence. This optional implementation provides a manner of performing a rate matching operation based on the beam indication information. In specific implementation, no limitation is imposed thereto.

In an optional implementation, the performing rate matching on a first bit sequence based on beam indication information, to obtain a second bit sequence may include: obtaining the second bit sequence according to a formula $e_k = w_{(j+k_0) \mod K_w}$, where $e_k$ represents the $k^{th}$ element in the second bit sequence, k is an integer, $w_{(j+k_0) \mod K_w}$ represents the $(j+k_0) \mod K_w^{th}$ element in the first bit sequence, k is in one-to-one correspondence with j, $k_0$ represents a value related to the beam indication information, and Kw represents a length of the first bit sequence.

According to a second aspect, a rate de-matching method is provided, and the method may be performed by a receive end. The method may include: performing rate de-matching on a second bit sequence based on beam indication information of a first beam. The beam indication information of the first beam may also be referred to as beam indication information associated with the first beam, and is used to indicate the first beam. The second bit sequence is a bit sequence obtained by performing rate matching on a first bit sequence based on the beam indication information of the first beam, and the first bit sequence is a bit sequence obtained by performing channel coding on an original data bit. This technical solution corresponds to the rate matching method provided in the first aspect. Therefore, for beneficial effects that can be achieved in this technical solution, refer to the foregoing description. Details are not described herein again.

It may be understood that if the second bit sequence is applied to a downlink transmission process, the method may be performed by a terminal device (for example, UE). If the second bit sequence is applied to an uplink transmission process, the method may be performed by a network device (for example, a base station).

In an optional implementation, the performing rate de-matching on a second bit sequence based on beam indication information of a first beam may include: determining an initial bit of the second bit sequence based on the beam indication information of the first beam; and performing rate de-matching on the second bit sequence based on the initial bit of the second bit sequence. This optional implementation provides a manner of performing a rate de-matching operation based on the beam indication information. In specific implementation, no limitation is imposed thereto. It may be understood that, without considering interference that is received when information is transmitted from a transmit end to a receive end, the original data bit can be obtained by performing channel decoding on a bit sequence obtained through rate de-matching on the second bit sequence.

According to a third aspect, this application provides an information transmission method, and the method may be performed by a network device (for example, a base station), or a terminal device. The method may include: performing rate matching on a first bit sequence based on beam indication information, to obtain a second bit sequence, where the first bit sequence is a bit sequence obtained by performing channel coding on an original data bit; mapping the second bit sequence onto a time-frequency resource; and sending, to a receive end by using a beam indicated by the beam indication information, the second bit sequence that is mapped onto the time-frequency resource. In this technical solution, beams are taken into account during a process in which a transmit end performs a rate matching operation. For explanations about related content, specific implementations of related steps, and beneficial effects of this technical solution, refer to the rate matching method provided in the first aspect.

In an optional implementation, the method may further include: sending the beam indication information to the receive end through RRC signaling, MAC signaling, DCI, or uplink control information UCI.

According to a fourth aspect, this application provides an information transmission method, and the method may be performed by a terminal device (for example, UE), or a network device (for example, a base station). The method may include: receiving a first signal that is sent from a transmit end by using a first beam; demodulating the first signal, to obtain a second bit sequence; and performing rate de-matching on the second bit sequence based on beam indication information associated with the first beam. In this technical solution, beams are taken into account during a process in which a receive end performs a rate de-matching operation. For explanations about related content, specific implementations of related steps, and beneficial effects of this technical solution, refer to the rate de-matching method provided in the second aspect.

In a possible implementation, the "first signal" and "second signal" below in this application are time-domain signals, and may specifically include, but is not limited to, any one of the following signals: an orthogonal frequency division multiplexing (OFDM) signal, a universal filtered multi-carrier (UFMC) signal, a filter bank multicarrier (FBMC) signal, a generalized frequency-division multiplexing (GFDM) signal, and the like. In specific implementations of this application, descriptions are made by using the OFDM signal as an example. It may be understood that the first signal may be specifically an OFDM symbol in the OFDM signal.

In a possible implementation, the method may further include: receiving the beam indication information through RRC signaling, MAC signaling, DCI, or UCI. The beam indication information may include beam information of each beam that is used when the transmit end sends information to the receive end. Beam information of a plurality of beams may be carried in one piece of signaling, or may be carried in different pieces of signaling.

In a possible implementation, the method may further include: receiving a second signal that is sent from the transmit end by using a second beam; demodulating the second signal, to obtain a third bit sequence; performing rate de-matching on the third bit sequence based on beam indication information associated with the second beam; performing soft combination on a bit sequence obtained by performing rate de-matching on the second bit sequence, and a bit sequence obtained by performing rate de-matching on the third bit sequence; and performing channel decoding on a bit sequence obtained after the soft combination.

The first signal and the second signal may be a same signal, or may be different signals. For example, the first signal and the second signal are a same OFDM symbol, or different OFDM symbols. The first beam and the second beam are two different beams. In this possible implementation, it may be considered that when information obtained through monitoring on one beam cannot be correctly decoded to obtain an original data bit, the following attempts can be made: obtaining information obtained on other beams through monitoring, performing operations such as demodulation and rate de-matching on the information obtained on different beams, and performing soft combination and channel decoding to obtain the original data bit.

According to a fifth aspect, this application provides a rate matching apparatus. The apparatus may be the transmit end according to the first aspect, or may be a chip configured to perform the rate matching method provided in the first aspect. The apparatus may include: a rate matching unit, configured to perform rate matching on a first bit sequence based on beam indication information, to obtain a second bit sequence, where the first bit sequence is a bit sequence obtained by performing channel coding on an original data bit.

In a possible implementation, the rate matching unit may be specifically configured to: determine an initial bit of the second bit sequence based on the beam indication information; and perform rate matching on the first bit sequence based on the initial bit of the second bit sequence, to determine the second bit sequence.

In a possible implementation, the rate matching unit may be specifically configured to: obtain the second bit sequence according to a formula $e_k = w_{(j+k_0) \bmod K_w}$, where $e_k$ represents the $k^{th}$ element in the second bit sequence, k is an integer, $w_{(j+k_0) \bmod K_w}$ represents the $(j+k_0) \bmod K_w^{th}$ element in the first bit sequence, k is in one-to-one correspondence with j, $k_0$ represents a value related to the beam indication information, and Kw represents a length of the first bit sequence.

According to a sixth aspect, this application provides a rate de-matching apparatus. The apparatus may be the receive end according to the second aspect, or may be a chip configured to perform the rate de-matching method provided in the second aspect. The apparatus may include: a rate de-matching unit, configured to perform rate de-matching on a second bit sequence based on beam indication information of a first beam.

In a possible implementation, the rate de-matching unit may be specifically configured to: determine an initial bit of the second bit sequence based on the beam indication information of the first beam; and perform rate de-matching on the second bit sequence based on the initial bit of the second bit sequence.

According to a seventh aspect, this application provides an information transmission apparatus. The apparatus may be a network device (for example, a base station), or may be a terminal device (for example, UE). The apparatus may include: a rate matching unit, a mapping unit, and a sending unit. The rate matching unit is configured to perform rate matching on a first bit sequence based on beam indication information, to obtain a second bit sequence, where the first bit sequence is a bit sequence obtained by performing channel coding on an original data bit. The mapping unit is configured to map the second bit sequence onto a time-frequency resource. The sending unit is configured to send, to a receive end by using a beam indicated by the beam indication information, the second bit sequence that is mapped onto the time-frequency resource.

In an optional implementation, the sending unit may be further configured to: send the beam indication information to the terminal device through RRC signaling, MAC signaling, DCI, or uplink control information UCI.

According to an eighth aspect, this application provides an information transmission apparatus. The apparatus may be a terminal device (for example, UE), or may be a network device (for example, a base station). The apparatus may include: a receiving unit, a demodulation unit, and a rate de-matching unit. The receiving unit is configured to receive a first signal that is sent from a transmit end by using a first beam. The demodulation unit is configured to demodulate the first signal, to obtain a second bit sequence. The rate de-matching unit is configured to perform rate de-matching on the second bit sequence based on beam indication information associated with the first beam.

In a possible implementation, the receiving unit may be further configured to receive the beam indication information through RRC signaling, MAC signaling, DCI, or UCI.

In a possible implementation, the receiving unit may be further configured to receive a second signal that is sent from the transmit end by using a second beam. The demodulation unit may be further configured to demodulate the second signal, to obtain a third bit sequence. The rate de-matching unit may be further configured to perform rate de-matching on the third bit sequence based on beam indication information associated with the second beam. The apparatus may further include a soft combination unit and a channel decoding unit. The soft combination unit is configured to perform soft combination on a bit sequence obtained by performing rate de-matching on the second bit sequence, and a bit sequence obtained by performing rate de-matching on the third bit sequence. The channel decoding unit is configured to perform channel decoding on a bit sequence obtained after the soft combination. According to any aspect provided above or any possible implementation provided in the foregoing aspects, the beam indication information may include at least one of the following information: a relative number of a beam, a logical number of the beam, a physical number of the beam, a port number, quasi co-location QCL information, beam pair link information, a terminal device group, and a time-domain symbol corresponding to the beam, where terminal devices corresponding to each beam are a terminal device group. For a correlation between an offset and the beam indication information, refer to specific implementations. Details are not described herein again.

According to a ninth aspect, this application provides a rate matching apparatus. The apparatus may implement functions executed in the rate matching method example provided in the first aspect. The functions may be implemented by hardware, or may be implemented by hardware by executing corresponding software. The hardware or the software includes one or more modules corresponding to the foregoing functions.

In a possible implementation, a structure of the apparatus includes a processor and a memory. Optionally, the apparatus may further include a communications interface. The processor is configured to enable the apparatus to execute corresponding functions in the method provided in the first aspect. The communications interface is configured to enable the apparatus to communicate with another network element. The memory is configured to be coupled to the processor, and store program instructions and data necessary for the apparatus. The processor may be integrated with the processor, or may be independent of the processor. The communications interface may be specifically a transceiver.

In a possible implementation, the apparatus may be a chip or a device.

According to a tenth aspect, this application provides a rate de-matching apparatus. The apparatus may implement functions executed in the rate de-matching method example provided in the second aspect. The functions may be implemented by hardware, or may be implemented by hardware by executing corresponding software. The hardware or the software includes one or more modules corresponding to the foregoing functions.

In a possible implementation, a structure of the apparatus includes a processor and a memory. Optionally, the apparatus may further include a communications interface. The processor is configured to enable the apparatus to execute corresponding functions in the method provided in the second aspect. The communications interface is configured to enable the apparatus to communicate with another network element. The memory is configured to be coupled to the processor, and store program instructions and data necessary for the apparatus. The processor may be integrated with the processor, or may be independent of the processor. The communications interface may be specifically a transceiver.

In a possible implementation, the apparatus may be a chip or a device.

According to an eleventh aspect, this application provides an information transmission apparatus. The apparatus may implement functions executed in the information transmission method example provided in the third aspect. The functions may be implemented by hardware, or may be implemented by hardware by executing corresponding software. The hardware or the software includes one or more modules corresponding to the foregoing functions.

In a possible implementation, a structure of the apparatus includes a processor and a memory. Optionally, the apparatus may further include a communications interface. The processor is configured to enable the apparatus to execute corresponding functions in the method provided in the third aspect. The communications interface is configured to enable the apparatus to communicate with another network element. The memory is configured to be coupled to the processor, and store program instructions and data necessary for the apparatus. The processor may be integrated with the processor, or may be independent of the processor. The communications interface may be specifically a transceiver.

In a possible implementation, the apparatus may be a chip or a device.

According to a twelfth aspect, this application provides an information transmission apparatus. The apparatus may implement functions executed in the information transmission method example provided in the fourth aspect. The functions may be implemented by hardware, or may be implemented by hardware by executing corresponding software. The hardware or the software includes one or more modules corresponding to the foregoing functions.

In a possible implementation, a structure of the apparatus includes a processor and a memory. Optionally, the apparatus may further include a communications interface. The processor is configured to enable the apparatus to execute corresponding functions in the method provided in the fourth aspect. The communications interface is configured to enable the apparatus to communicate with another network element. The memory is configured to be coupled to the processor, and store program instructions and data necessary for the apparatus. The processor may be integrated with the processor, or may be independent of the processor. The communications interface may be specifically a transceiver.

In a possible implementation, the apparatus may be a chip or a device.

According to a thirteenth aspect, this application provides a computer storage medium. The computer storage medium is configured to store a computer software instruction corresponding to the rate matching method provided in the first aspect, and the computer software instruction includes a program designed for implementing the ninth aspect.

According to a fourteenth aspect, this application provides a computer storage medium. The computer storage medium is configured to store a computer software instruction corresponding to the rate de-matching method provided in the second aspect, and the computer software instruction includes a program designed for implementing the tenth aspect.

According to a fifteenth aspect, this application provides a computer storage medium. The computer storage medium is configured to store a computer software instruction corresponding to the information transmission method provided in the third aspect, and the computer software instruction includes a program designed for implementing the eleventh aspect.

According to a sixteenth aspect, this application provides a computer storage medium. The computer storage medium is configured to store a computer software instruction corresponding to the information transmission method provided in the fourth aspect, and the computer software instruction includes a program designed for implementing the twelfth aspect.

According to a seventeenth aspect, this application provides a computer program product. When running on a computer, the computer program product enables the computer to perform any rate matching method provided in the first aspect.

According to an eighteenth aspect, this application provides a computer program product. When running on a computer, the computer program product enables the computer to perform any rate de-matching method provided in the second aspect.

According to a nineteenth aspect, this application provides a computer program product. When running on a computer, the computer program product enables the computer to perform any information transmission method provided in the third aspect.

According to a twentieth aspect, this application provides a computer program product. When running on a computer, the computer program product enables the computer to perform any information transmission method provided in the fourth aspect.

It may be understood that any apparatus, computer storage medium, or computer program provided above is configured to perform the corresponding method provided above. Therefore, for beneficial effects that can be achieved by the apparatus, computer storage medium, or computer program, refer to the beneficial effects in the corresponding methods provided above. Details are not described herein.

DESCRIPTION OF EMBODIMENTS

Figure 1:
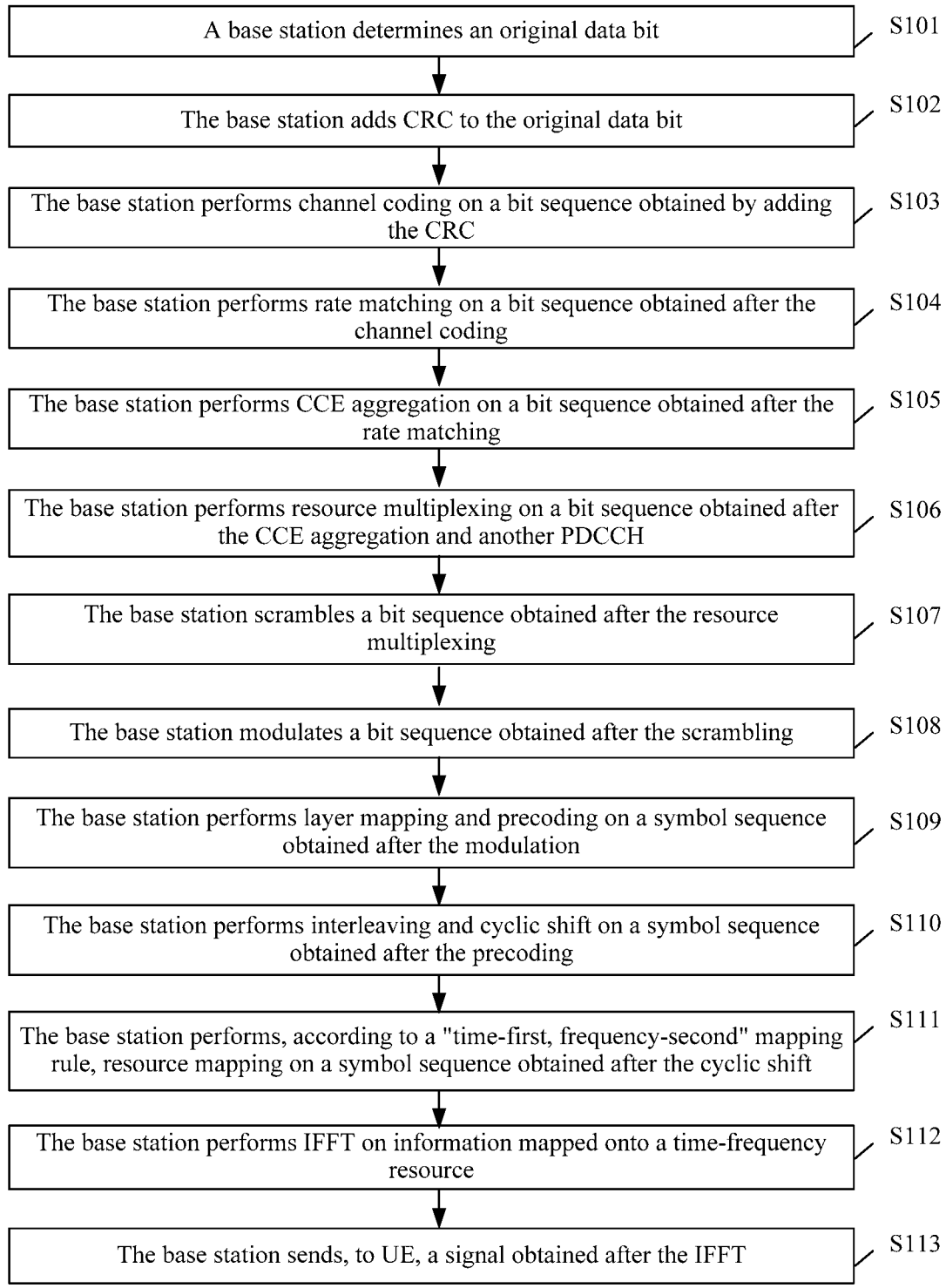
FIG. 1 is a schematic diagram of a procedure in which a base station processes a PDCCH in an LTE system according to the prior art.

First, related technologies and terms in this application are briefly described, to help understanding of readers.

(1) Time-Domain Resource for Transmitting a Control Channel

In an LTE system, a channel is transmitted in radio frames (radio frame). One radio frame includes 10 subframes (subframe). Duration of each subframe is 1 millisecond (ms). Each subframe includes two slots (slot), and each slot is 0.5 ms. A quantity of symbols included in each slot is related to duration of a cyclic prefix (CP) in the subframe. If the CP is a normal (normal) CP, each slot includes seven symbols, and each subframe includes 14 symbols. For example, each subframe may include symbols whose sequence numbers are #0, #1, #2, #3, #4, #5, #6, #7, #8, #9, #10, #11, #12, and #13.

If the CP is an extended (extended) CP, each slot includes six symbols, and each subframe includes 12 symbols. For example, each subframe may include symbols whose sequence numbers are #0, #1, #2, #3, #4, #5, #6, #7, #8, #9, #10, and #11. The "symbol" herein is an orthogonal frequency division multiplexing (OFDM) symbol.

In the LTE system, a PDCCH is usually transmitted in the first OFDM symbol or first two or first three OFDM symbols of a subframe. These OFDM symbols may be referred to as control symbols. For example, if a bandwidth of the LTE system is 1.4 megahertz (MHz), a PDCCH may be transmitted in the $\{2, 3, 4\}^{th}$ OFDM symbols.

(2) Time-Frequency Resource for Transmitting a Control Channel

In the LTE system, a resource element (RE) is a minimal time-frequency resource unit. The RE may be uniquely identified by an index pair (k, l), where k represents a subcarrier index, and l represents a symbol index. Four consecutive REs (where an RE occupied by a reference signal is not counted in) constitute one resource element group (REG). The REG may be identified by an index pair (k', l').

During transmission of a control channel, a basic unit of the time-frequency resource that carries the control channel is a control channel element (CCE). One CCE includes nine REGs. A PDCCH may be transmitted by using different aggregation levels (AL). The aggregation level means a quantity of CCEs on which the PDCCH is carried. The aggregation level may be 1, 2, 4, or 8. For example, when the aggregation level is 2, it indicates that the PDCCH is carried on two CCEs.

(3) Time-Frequency Resource Available to the PDCCH

A time-frequency resource corresponding to a symbol (where, in the LTE system, the symbol is usually the first symbol) in which the PDCCH is located may also carry the following information: a reference signal (RS), a physical control format indicator channel (PCFICH), and a physical HARQ indicator channel (PHICH). HARQ is an English abbreviation of hybrid automatic repeat request (hybrid automatic repeat request).

The PCFICH carries control format indicator (CFI) information, and the CFI information is used to notify user equipment (UE) of a quantity of symbols occupied by the control channel. The CFI information may be used by the UE to calculate a total quantity of resources occupied by the control channel. The CFI information may also be used by the UE to determine a start location of a data channel in time domain, that is, starting from which symbol the data channel is transmitted. The PCFICH is a kind of broadcast channel. A base station sends the PCFICH in the first symbol of a subframe. A configuration of the PCFICH is notified by using other signaling.

If the UE sends uplink data, the UE expects the base station to feed back whether the uplink data is correctly received. The PHICH may be used to perform a HARQ feedback for the uplink data of the UE. The PHICH is a kind of multicast channel. The base station may send the PHICH in the first OFDM symbol of a subframe. A configuration of the PHICH is notified by using a master information block (MIB) carried on a physical broadcast channel (PBCH).

A total REG quantity corresponding to symbols occupied by the control channel is determined by a quantity of symbols and the bandwidth. Time-frequency resources available to the PDCCH are obtained by subtracting time-frequency resources occupied by the PCFICH and the PHICH from the total REG quantity.

(4) Search Space

To reduce complexity of the UE, two types of search spaces are defined in the LTE system: a common search space and a UE-specific search space. In the common search space, the aggregation level of the PDCCH may be 4 or 8. In the UE-specific search space, the aggregation level of the PDCCH may be 1, 2, 4 or 8. It is specified in LTE that one PDCCH can merely include n consecutive CCEs, and can use only the CCE as a start location, where i mod n=0.

(5) Beam and Beam Pair (Beam Pair Link)

A beam is a kind of communication resource. The beam may be a wide beam, a narrow beam, or another type of beam. A technology for forming a beam may be a beamforming technology or other technical means. The beamforming (beamforming) technology may be specifically a digital beamforming technology, an analog beamforming technology, or a hybrid beamforming technology. Different beams may be considered as different resources. Same information or different information may be sent by using different beams. Optionally, a plurality of beams having the same or similar communication features may be considered as one beam. One beam may include one or more antenna ports, to transmit a data channel, a control channel, a sounding signal, and the like. For example, a transmit beam may be distribution of signal strength in different spatial directions after signals are transmitted through antennas. A receive beam may be distribution of signal strength, of radio signals received from antennas, in different spatial directions. It may be understood that one or more antenna ports that form one beam may also be considered as an antenna port set.

A beam pair is based on the concept of beam. A beam pair usually includes a transmit beam of a transmit end and a receive beam of a receive end. It should be noted that "beam" below refers to a transmit beam of the base station. A receive beam of the UE is not defined in this application.

(6) Other Terms

The term "a plurality of" in this specification means two or more than two.

The terms "first", "second", and the like in this specification are merely intended to distinguish between different objects, but do not limit a sequence of the objects. For example, a first symbol group and a second symbol group are merely intended to distinguish between different symbol groups, but do not limit a sequence of the symbol groups.

The term "and/or" in this specification describes only an association relationship between associated objects and indicates that three relationships may exist. For example, A and/or B may indicate the following three cases: Only A exists, both A and B exist, and only B exists. In addition, the character "/" in this specification generally indicates an "or" relationship between the associated objects. In a formula, the character "/" indicates a "dividing" relationship between the associated objects.

The following describes procedures in which a base station and UE process a PDCCH in an LTE system.

FIG. 1 is a schematic diagram of a procedure in which a base station processes a PDCCH in an LTE system. Specifically, the following steps S101 to S113 may be included.

S101: A base station determines an original data bit. In this embodiment, that the base station sends downlink control information (DCI) to UE in the $k^{th}$ subframe is used as an example of sending a PDCCH by the base station. In this case, the original data bit is the DCI.

S102: The base station adds CRC to the original data bit, where a length of the CRC may be defined by a protocol.

A bit sequence obtained after the base station performs S102 may be represented as $c_0, c_1, c_2, c_3, \ldots, c_{K-1}$, where K represents a length of the bit sequence obtained after the CRC is added.

S103: The base station performs channel coding on a bit sequence obtained after the CRC is added.

Channel coding is one of the most important parts of a communications system, and can provide error detection and correction capabilities for information bit transmission. In LTE, tail-biting convolutional coding (TBCC) or the like may be used for control channel coding. In 5G new radio (NR), polar coding or the like may be used for control channel coding. This is not limited in this application. Bit sequences output after $i^{th}$ channel coding are $d_0^{(i)}, d_1^{(i)}, d_2^{(i)}, d_3^{(i)}, \ldots, d_{D-1}^{(i)}$. If rate-1/3 TBCC coding is used for the control channel in LTE, bit sequences output after channel coding are $d_k^0, d_k^1, d_k^2$.

S104: The base station performs rate matching on a bit sequence obtained after the channel coding.

The rate matching means matching a quantity of bits (that is, a quantity of bits of the bit sequence obtained after the channel coding) to be transmitted to a quantity of bits that can be carried by an allocated resource. Common rate matching methods may include retransmission, truncation, puncturing, and the like.

Figure 1A:
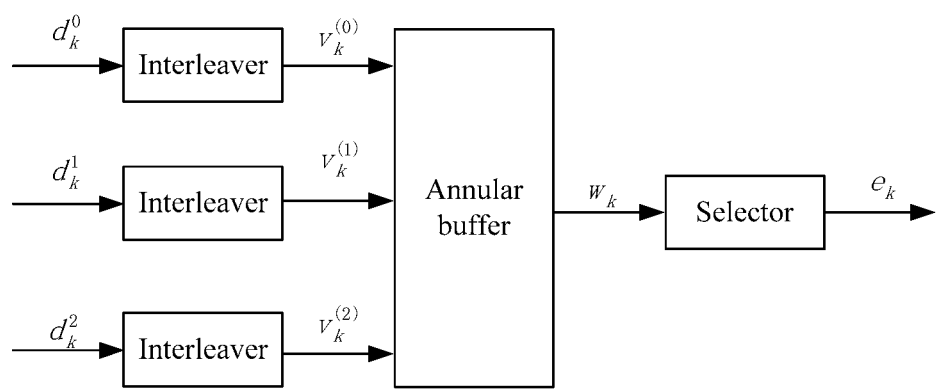
FIG. 1a is a schematic diagram of a rate matching process according to the prior art.

A rate matching process is shown in FIG. 1a. FIG. 1a is described based on the example in S103. In FIG. 1a:

(1) Sequences $v_k^{(0)}, v_k^{(1)}$, and $v_k^{(2)}$ are output after interleaving operations are performed on the bit sequences $d_k^0, d_k^1, d_k^2$ by interleavers.

$v_k^{(0)}$ is obtained after the bit sequence $d_k^{(0)}$ is interleaved, where $v_k^{(0)}$ is specifically: $v_0^{(0)}, v_1^{(0)}, v_2^{(0)}, \ldots, v_{K_\Pi-1}^{(0)}$.

$v_k^{(1)}$ is obtained after the bit sequence $d_k^{(1)}$ is interleaved, where $v_k^{(1)}$ is specifically: $v_0^{(1)}, v_1^{(1)}, v_2^{(1)}, \ldots, v_{K_\Pi-1}^{(1)}$.

$v_k^{(2)}$ is obtained after the bit sequence $d_k^{(2)}$ is interleaved, where $v_k^{(2)}$ is specifically: $v_0^{(2)}, v_1^{(2)}, v_2^{(2)}, \ldots, v_{K_\Pi-1}^{(2)}$.

$K_\Pi$ is an interleaver parameter. $K_\Pi = (R_{subblock}^{CC} \times C_{subblock}^{CC}) > D$, where $C_{subblock}^{CC} = 32$, D is an input sequence length of the interleaver, and $R_{subblock}^{CC}$ is a smallest integer that satisfies this inequation.

For a specific implementation process of interleaving, details are not described herein.

(2) $W_k, w_{K_\Pi+k}$, and $W_{2K_\Pi+k}$ are sequentially output after the output sequences of the interleaver pass through an annular buffer. The annular buffer is a logical concept.

An output length of the annular buffer is $K_w = 3K_\Pi$, that is:

$w_k = v_k^{(0)}$, where $k=0, \ldots,$ and $K_\Pi - 1$;

$w_{K_\Pi+k} = v_k^{(1)}$, where $k=0, \ldots,$ and $K_\Pi - 1$; and $w_{2K_\Pi+k} = V_k^{(2)}$, where $k=0, \ldots,$ and $K_\Pi - 1$.

(3) When the output sequences of the annular buffer pass through a selector, a bit sequence with an output length of E is selected. If an element in this bit sequence is denoted as $e_k$, $k=0, 1, \ldots,$ and $E-1$.

$e_k = w_{j \bmod K_w}$, $k < E$, and $w_{j \bmod K_w} \neq <NULL>$.

E is determined by an aggregation level. When aggregation levels are 1, 2, 4, and 8, respective Es are 72, 144, 288, and 576.

S105: The base station performs CCE aggregation on a bit sequence obtained after the rate matching.

A total quantity of CCEs in a system is $N_{CCE} = \lfloor N_{REG}/9 \rfloor$, where $\lfloor \; \rfloor$ represents round down, and $N_{REG}$ represents a total quantity of REGs available for PDCCH transmission, that is, a total quantity of REGs except REGs occupied by a PHICH and a PCFICH. It may be learned from the foregoing description that one PDCCH can be transmitted on {1, 2, 4, 8} CCEs in an aggregation manner. Information of 72 bits can be mapped to each CCE.

S106: The base station performs resource multiplexing on a bit sequence obtained after the CCE aggregation and a PDCCH sent by the base station to another UE. Multiplexing means transmitting a plurality of PDCCHs on a same resource.

For example, assuming that a length of a bit sequence of the $i^{th}$ PDCCH is $M_{bit}^{(i)}$ and that the bit sequence is represented as $b^{(i)}(0), \ldots, b^{(i)}(M_{bit}^{(i)}-1)$, a bit sequence obtained after the base station performs resource multiplexing on $n_{PDCCH}$ PDCCHs may be $b^{(0)}(0), \ldots, b^{(0)}(M_{bit}^{(0)}-1), \ldots, b^{(nPDCCH-1)}(0), \ldots, b^{(nPDCCH-1)}(M_{bit}^{(nPDCCH-1)}-1)$. For brevity of description, in this application, this sequence is defined as b(i), and a total length of b(i) is $M_{tot} = 8N_{REG} \geq \Sigma_{i=0}^{nPDCCH-1} M_{bit}^{(i)}$.

For example, bit sequences mapped on CCEn, that is, the $n^{th}$ CCE, may be: b(72*n), b(72*n+1), ..., and b(72*n+71). If any CCE is not occupied, <NIL> is added correspondingly.

S107: The base station scrambles a bit sequence obtained after the resource multiplexing.

Scrambling means using a sequence (that is, a scrambling sequence) to perform an addition modulo 2 operation on another sequence (that is, a to-be-scrambled bit sequence), to randomize interference between neighboring cells.

S108: The base station modulates a bit sequence obtained after the scrambling.

In the LTE system, a quadrature phase shift keying (QPSK) modulation scheme is usually used to modulate the PDCCH. To be specific, two bits are modulated to one QPSK symbol. A specific modulation scheme is not limited in this application. A symbol sequence d(m) is obtained after b(i) obtained in S107 is modulated.

S109: The base station performs layer mapping (layer mapping) and precoding (precoding) on a symbol sequence obtained after the modulation.

Precoding is an optional step. For brevity of description, specific examples below are all described on a basis of not considering this step. A specific implementation of S109 is not limited in this application. Using an antenna port as an example, a symbol sequence obtained by performing layer mapping and precoding on the symbol sequence d(m) is denoted as y(m).

S110: The base station performs interleaving and cyclic shift on a symbol sequence obtained after the precoding.

In the LTE system, the interleaving operation and the cyclic shift operation are performed in a form of quadruplets (quadruplet). Using an antenna port as an example, a quadruplet z(i)=<y(4i), y(4i+1), y(4i+2), y(4i+3)>. A quadruplet sequence may be represented as z(0), z(1), z(2), z(3), .... The interleaving and the cyclic shift are performed on the quadruplet sequence. If information obtained for an element z(i) in the quadruplet sequence after the base station performs an interleaving operation on the quadruplet sequence is denoted as w(i), information obtained after the base station performs an interleaving operation on the quadruplet sequence $z(0)$, $z(1)$, $z(2)$, $z(3)$, ... may be denoted as $w(0)$, $w(1)$, $w(2)$, $w(3)$, ....

The cyclic shift is related to a cell ID. If information obtained after the base station performs a cyclic shift operation on an element $w(i)$ in the quadruplet sequence is denoted as $\overline{w}(i)$, $$\overline{w}(i) = w((i + N_{ID}^{Cell}) \bmod M_{quad}).$$

$M_{quad}$ represents a quantity of quadruplets, and is related to a modulation scheme. If modulation is performed by using the QPSK modulation scheme, $M_{quad}$ represents dividing a quantity of QPSK symbols by 4, that is, $M_{quad} = M_{symb}/4$.

S111: The base station performs, according to a "time-first, frequency-second" mapping rule, resource mapping on a symbol sequence obtained after the cyclic shift.

Resource mapping means mapping a symbol sequence onto a time-frequency resource. Using an antenna port as an example, resource mapping means mapping $\overline{w}(i)$ onto a REG (k', l') corresponding to the port. In the LTE system, the mapping rule is "time-first, frequency-second". For example, assuming that the control channel occupies three symbols, the resource mapping may be specifically: mapping, by the base station, $\overline{w}(0)$ to a REG (0, 0), $\overline{w}(1)$ to a REG (0, 1), $\overline{w}(2)$ to a REG (0, 2), $\overline{w}(3)$ to a REG (1, 0), ....

S112: The base station performs inverse fast fourier transform (inverse fast fourier transform, IFFT) on information mapped onto a time-frequency resource.

A QPSK symbol on a subcarrier is modulated to an OFDM waveform through the IFFT.

S113: The base station sends, to UE, a signal obtained after the IFFT, that is, an OFDM time-domain signal.

Figure 2:
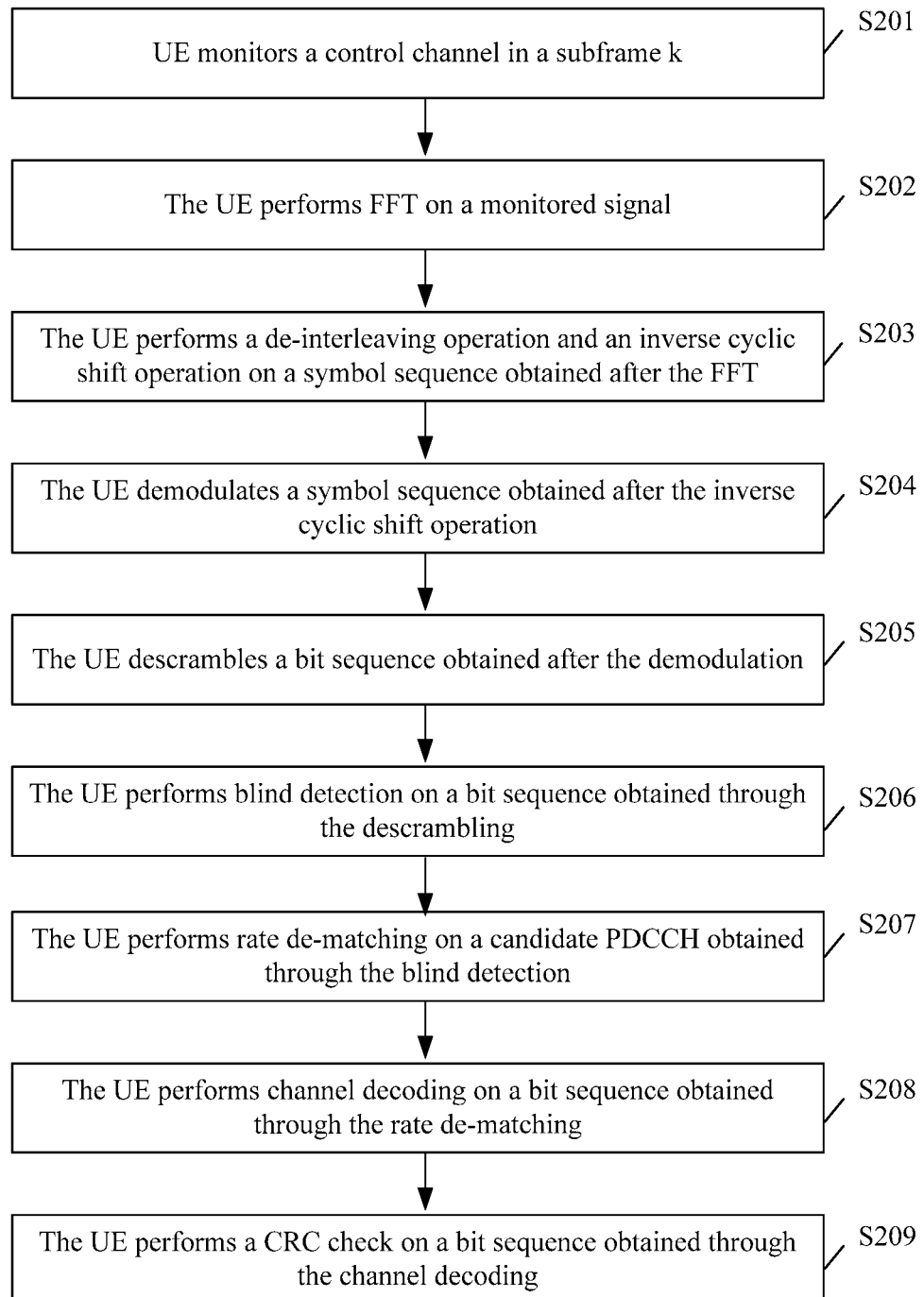
FIG. 2 is a schematic diagram of a procedure in which UE processes a PDCCH in an LTE system according to the prior art.

FIG. 2 is a schematic diagram of a procedure in which UE processes a PDCCH in an LTE system. It is assumed that the UE receives a PDCCH in the $k^{th}$ subframe (that is, a subframe k) and that a modulation scheme is QPSK. The method may include the following steps S201 to S209.

S201: The UE monitors a control channel in the subframe k. A signal monitored by the UE (that is, a signal received by the UE) is a radio signal carried by an OFDM waveform, that is, an OFDM time-domain signal.

S202: The UE performs fast fourier transform (FFT) on a monitored signal.

After the UE performs the FFT, an OFDM symbol may be transformed into a QPSK symbol, to obtain a symbol sequence.

S203: The UE performs a de-interleaving operation and an inverse cyclic shift operation on a symbol sequence obtained after the FFT. Processes of the de-interleaving operation and the inverse cyclic shift operation correspond to S110, and may be considered as an inverse process of S110.

S204: The UE demodulates a symbol sequence obtained after the inverse cyclic shift operation.

The symbol sequence may be converted into a bit sequence after the UE performs the demodulation. The demodulation process corresponds to S108, and may be considered as an inverse process of S108.

S205: The UE de-scrambles a bit sequence obtained after the demodulation.

The de-scrambling process corresponds to S107, and may be considered as an inverse process of S107.

S206: The UE performs blind detection on a bit sequence obtained through the de-scrambling.

Blind detection means that the UE tries locations and aggregation levels of all possible candidate PDCCHs in a search space. A specific implementation of the blind detection is not limited in this application. For example, the $m^{th}$ candidate PDCCH obtained through the blind detection may include the following CCEs:

$$L\{(Y_k + m') \bmod \lfloor N_{CCE,k}/L \rfloor\} + i$$

L represents an aggregation level, and may be $\{1, 2, 4, 8\}$. $N_{CCE,k}$ represents a quantity of CCEs used for transmitting a control channel in the subframe k. $i = 0, \ldots, L-1$. $m = 0, \ldots, M^{(L)} - 1$. $M^{(L)}$ represents a quantity of candidate PDCCHs when the aggregation level is L. It is specified in LTE that, for a UE-specific search space, when $L = \{1, 2, 4, 8\}$, $M^{(L)}$ is $\{6, 6, 2, 2\}$; and for a common search space, when $L = \{4, 8\}$, $M^{(L)}$ is $\{4, 2\}$.

For the common search space, $m' = m$, and $Y_k = 0$.

For the UE-specific search space, $m' = m + M^{(L)} \cdot n_a$, $Y_k = (A \sim Y_{k-1}) \bmod D$, $Y_{-1} = n_{RNTI} \neq 0$, $A = 39827$, $D = 65537$, $k = \lfloor n_s/2 \rfloor$, where $n_{RNTI}$ represents a UE ID used to identify UE; $n_a$ represents a carrier indicator, and is 0 in a case of a single carrier; and $n_s$ represents a slot number in a radio frame.

S207: The UE performs rate de-matching on a candidate PDCCH obtained through the blind detection.

The rate de-matching process corresponds to S104, and may be considered as an inverse process of S104.

S208: The UE performs channel decoding on a bit sequence obtained through the rate de-matching.

S209: The UE performs a CRC check on a bit sequence obtained through the channel decoding.

The UE determines, through the CRC check, whether reception is correct, that is, whether the candidate PDCCH obtained through the blind detection in S206 is truly a PDCCH sent to the UE. If the CRC check fails, the blind detection is performed to obtain a next candidate PDCCH, until all candidate PDCCHs are traversed. If the CRC check succeeds, it indicates that the candidate PDCCH obtained through the blind detection in S206 is the PDCCH sent to the UE.

According to discussions about 5G NR, to ensure robustness (robustness) of the control channel, a plurality of beams may be used to transmit the PDCCH to one UE. A plurality of beams may be used at the same time for communication between the UE and the base station. The robustness may be understood as stability, soundness, or the like.

However, it can be learned from the foregoing description that the technical solutions provided above have at least the following technical problems:

First, an information processing procedure related to beams is not taken into account in LTE.

Second, in a scenario in which the base station uses a plurality of beams to send PDCCHs to one UE, if the foregoing processing procedure is still used, steps that are the same as those described above are performed once on each of the plurality of beams of the base station. This means that a condition of a plurality of beams is not fully used.

In view of this, this application provides an information transmission method and apparatus. In the information transmission method and apparatus provided in this application, specifically, impact of a beam on rate matching is taken into account, thereby improving robustness of information transmission.

Technical solutions of this application are described below in detail with reference to accompanying drawings in this application.

Figure 3:
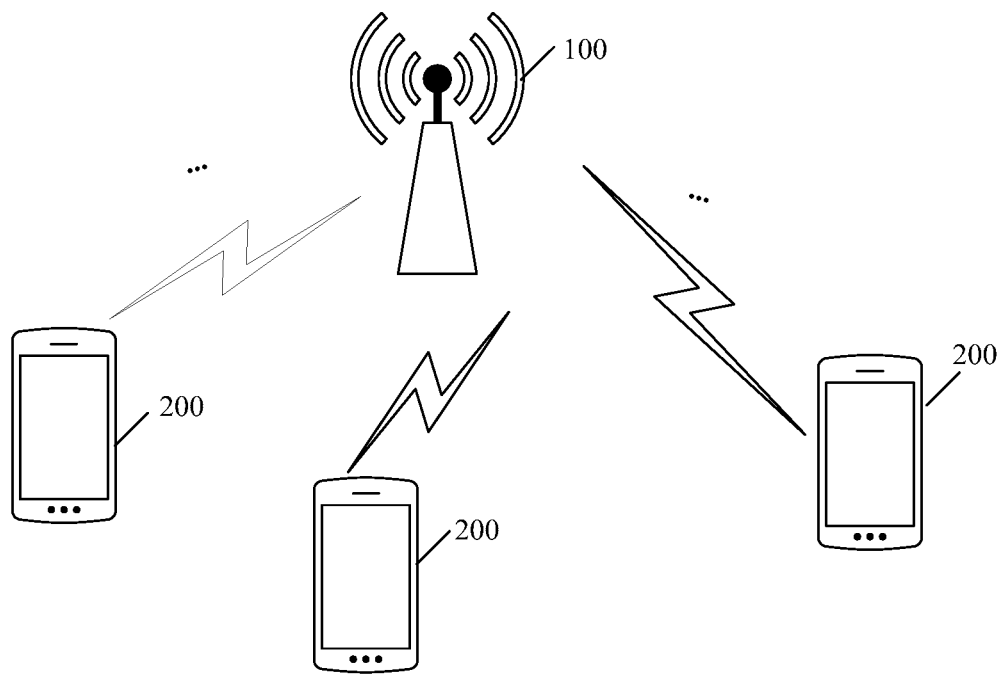
FIG. 3 is a schematic diagram of a system architecture to which a technical solution according to an embodiment of this application is applicable.

The technical solutions provided in this application may be applied to a system architecture shown in FIG. 3. The system architecture shown in FIG. 3 includes a network device 100 and one or more terminal devices 200 connected to the network device 100.

The network device 100 may be a device that can communicate with the terminal device 200. The network device 100 may be a base station, a relay station, an access point, or the like. The base station may be a base transceiver station (BTS) in a global system for mobile communications (GSM) or code division multiple access (CDMA) network, may be an NB (NodeB) in wideband code division multiple access (WCDMA), or may be an eNB or eNodeB (evolved NodeB) in LTE. Alternatively, the network device 100 may be a wireless controller in a scenario of a cloud radio access network (CRAN). Alternatively, the network device 100 may be a network device in a future 5G network, a network device in a future evolved PLMN network, a wearable device, an in-vehicle device, or the like.

The terminal device 200 may be UE, an access terminal, a UE unit, a UE station, a mobile station, a mobile station, a remote station, a remote terminal, a mobile device, a UE terminal, a terminal, a wireless communications device, a UE agent, a UE apparatus, or the like. The access terminal may be a cellular phone, a cordless phone, a SIP (session initiation protocol) phone, a WLL (wireless local loop) station, a personal digital assistant (PDA), a handheld device having a wireless communication function, a computing device, another processing device connected to a wireless modem, an in-vehicle device, a wearable device, a terminal device in the future 5G network, a terminal device in the future evolved PLMN network, or the like.

It should be noted that, in this specification, descriptions are made by using an example in which the network device 100 is a base station and the terminal device 200 is UE.

Figure 4:
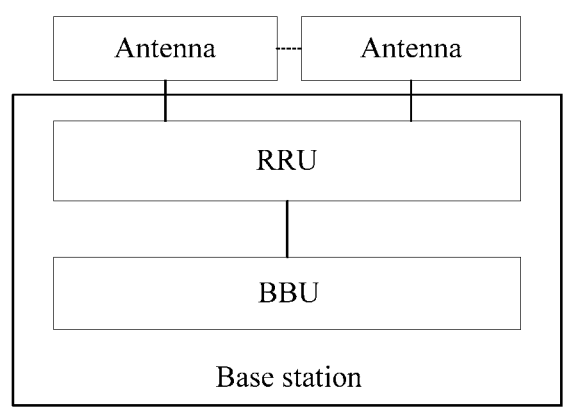
FIG. 4 is a schematic structural diagram of a network device according to an embodiment of this application.

For example, the network device 100 is a base station. The following describes a general hardware architecture of the base station. As shown in FIG. 4, the base station may include a building baseband unit (BBU) and a remote radio unit (RRU). The RRU is connected to an antenna feeder system (that is, an antenna). The BBU and the RRU may be used separately according to requirements.

Figure 5:
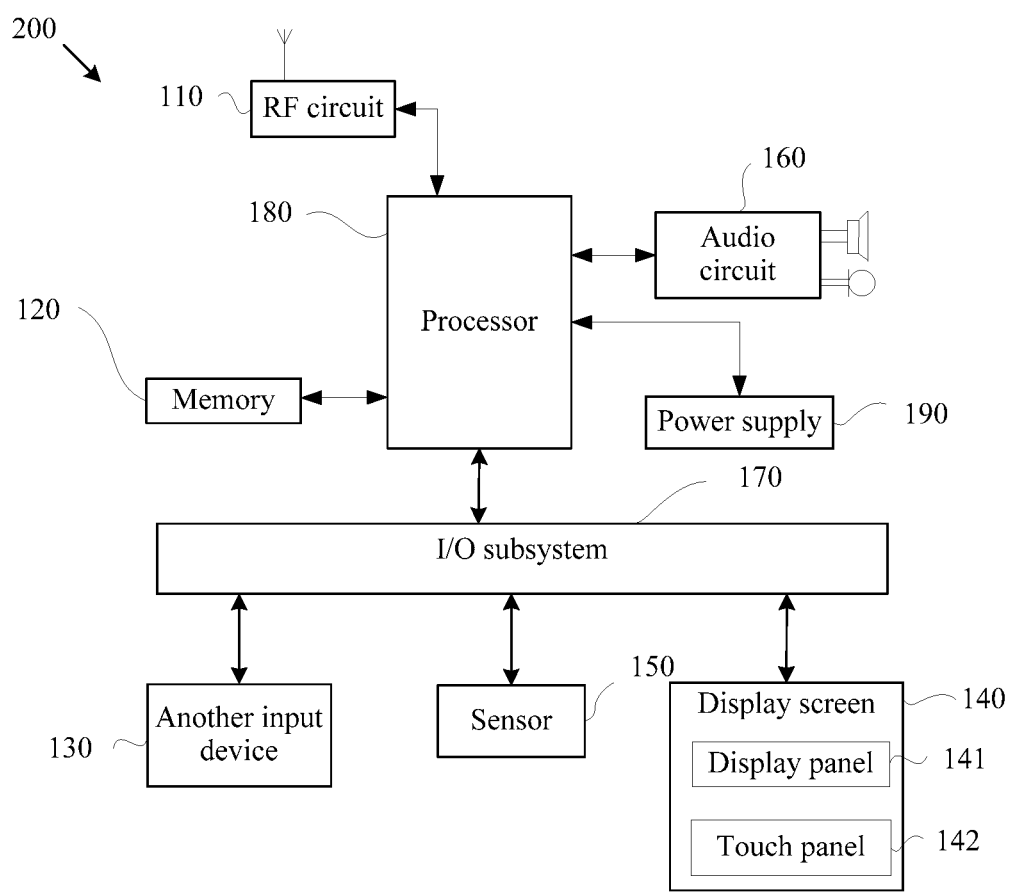
FIG. 5 is a schematic structural diagram of a terminal device according to an embodiment of this application.

For example, the terminal device 200 is a mobile phone. The following describes a general hardware architecture of the mobile phone. As shown in FIG. 5, the mobile phone may include components such as a radio frequency (RF) circuit 110, a memory 120, another input device 130, a display screen 140, a sensor 150, an audio circuit 160, an I/O subsystem 170, a processor 180, and a power supply 190. A person skilled in the art may understand that a structure of the mobile phone shown in FIG. 5 does not constitute any limitation on the mobile phone, and the mobile phone may include components more or fewer than the components shown in the figure, some components are combined, some components are split, or components are arranged differently. A person skilled in the art may understand that the display screen 140 is a user interface (UI), and the display screen 140 may include a display panel 141 and a touch panel 142. Moreover, the mobile phone may include components more or fewer than the components shown in the figure. Although not shown in the figure, the mobile phone may further include function modules or components such as a camera and a Bluetooth module. Details are not described herein.

Further, the processor 180 is connected to the RF circuit 110, the memory 120, the audio circuit 160, the I/O subsystem 170, and the power supply 190. The I/O subsystem 170 is connected to the another input device 130, the display screen 140, and the sensor 150. The RF circuit 110 may be configured to receive and send signals during an information receiving and sending process or a call process, and particularly, receive downlink information of the base station, and then send the downlink information to the processor 180 for processing. The memory 120 may be configured to store a software program and a module. The processor 180 executes various function applications of the mobile phone and processes data by running the software program and the module stored in the memory 120. The another input device 130 may be configured to receive input digital or character information, and generate key signal input related to user settings and function control of the mobile phone. The display screen 140 may be configured to display information input by a user, information provided for the user, and various menus of the mobile phone, and may also receive user input. The sensor 150 may be a light sensor, a motion sensor, or another sensor. The audio circuit 160 may provide an audio interface between the user and the mobile phone. The I/O subsystem 170 is configured to control an external device for input and output. The external device may include another device input controller, a sensor controller, and a display controller. The processor 180 is a control center of the mobile phone 200, and is connected to all parts of the entire mobile phone by using various interfaces and lines. The processor 180 executes various functions of the mobile phone 200 and processes data by running or executing the software program and/or the module stored in the memory 120 and invoking data stored in the memory 120, to perform overall monitoring on the mobile phone. The power supply 190 (for example, a battery) is configured to supply power to the components described above. Preferably, the power supply may be logically connected to the processor 180 through a power supply management system, to implement functions such as charging, discharging, and power consumption management through the power supply management system.

It should be noted that the technical solutions provided in this application may be particularly applied to a 5G NR system. According to discussions about 5G NR, to ensure robustness of a control channel, a plurality of beams may be used to transmit a PDCCH to one UE. The technical solutions provided in this application are particularly applicable to a multi-beam scenario. One PDCCH may be sent by using a plurality of beams in the following two typical scenarios. The information transmission method provided in this application may be applied to downlink and uplink. When the method is applied to downlink, a transmit end is a network device, and a receive end is a terminal device such as UE. When the method is applied to uplink, the transmit end is a terminal device, and the receive end is a network device such as a base station. Descriptions are made below mainly by using downlink as an example.

Figure 6:
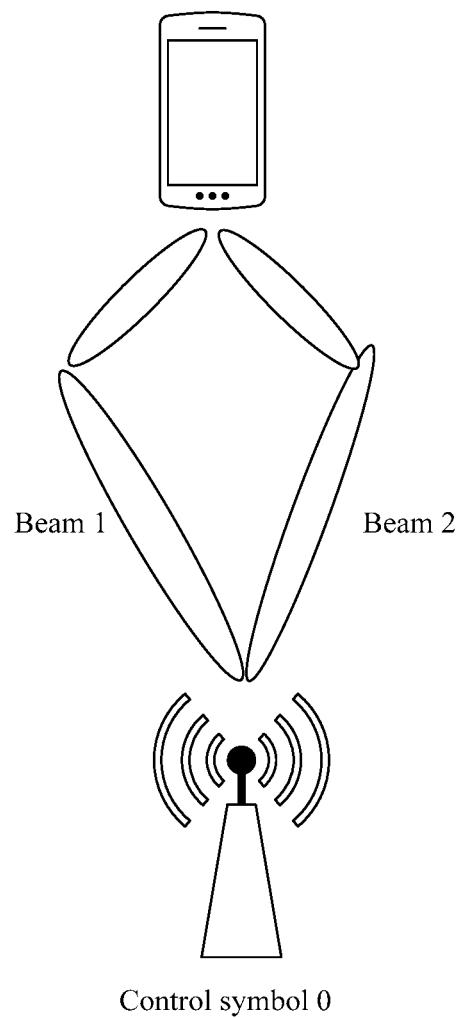
FIG. 6 is a schematic diagram of a scenario to which a technical solution according to an embodiment of this application is applicable.

Scenario 1: A plurality of beams may be used at the same time for communication between the UE and the base station. As shown in FIG. 6, the base station uses one control symbol (that is, a control symbol 0) to transmit a PDCCH to the UE, and uses two beams (that is, a beam 1 and a beam 2) at the same time to transmit the PDCCH.

Figure 7:
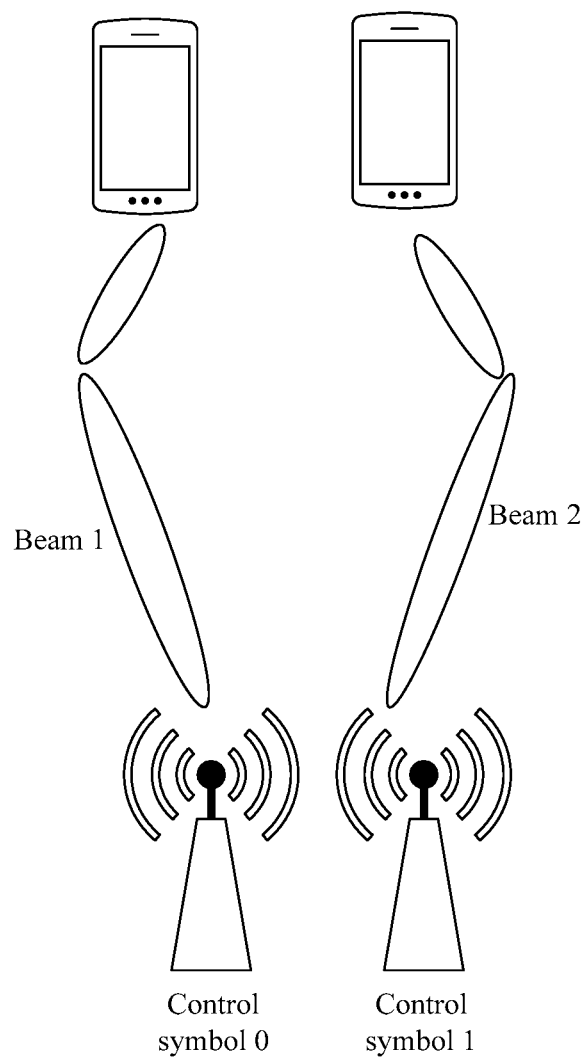
FIG. 7 is a schematic diagram of another scenario to which a technical solution according to an embodiment of this application is applicable.

Scenario 2: The UE communicates with the base station by using one beam at one moment. As shown in FIG. 7, the base station uses two control symbols (that is, a control symbol 0 and a control symbol 1) to transmit a PDCCH to the UE, and transmits one control symbol on each beam, that is, transmits the control symbol 0 on the beam 1 and transmits the control symbol 2 on the beam 2.

It may be understood that the foregoing FIG. 6 and FIG. 7 are merely examples, and do not constitute limitation on applicable scenarios of the technical solutions provided in this application. For example, the base station may transmit a PDCCH on at least three control symbols.

For ease of description, the information transmission method performed by the base station and the UE in the embodiments of this application are described in detail in a form of steps.

Figure 8A:
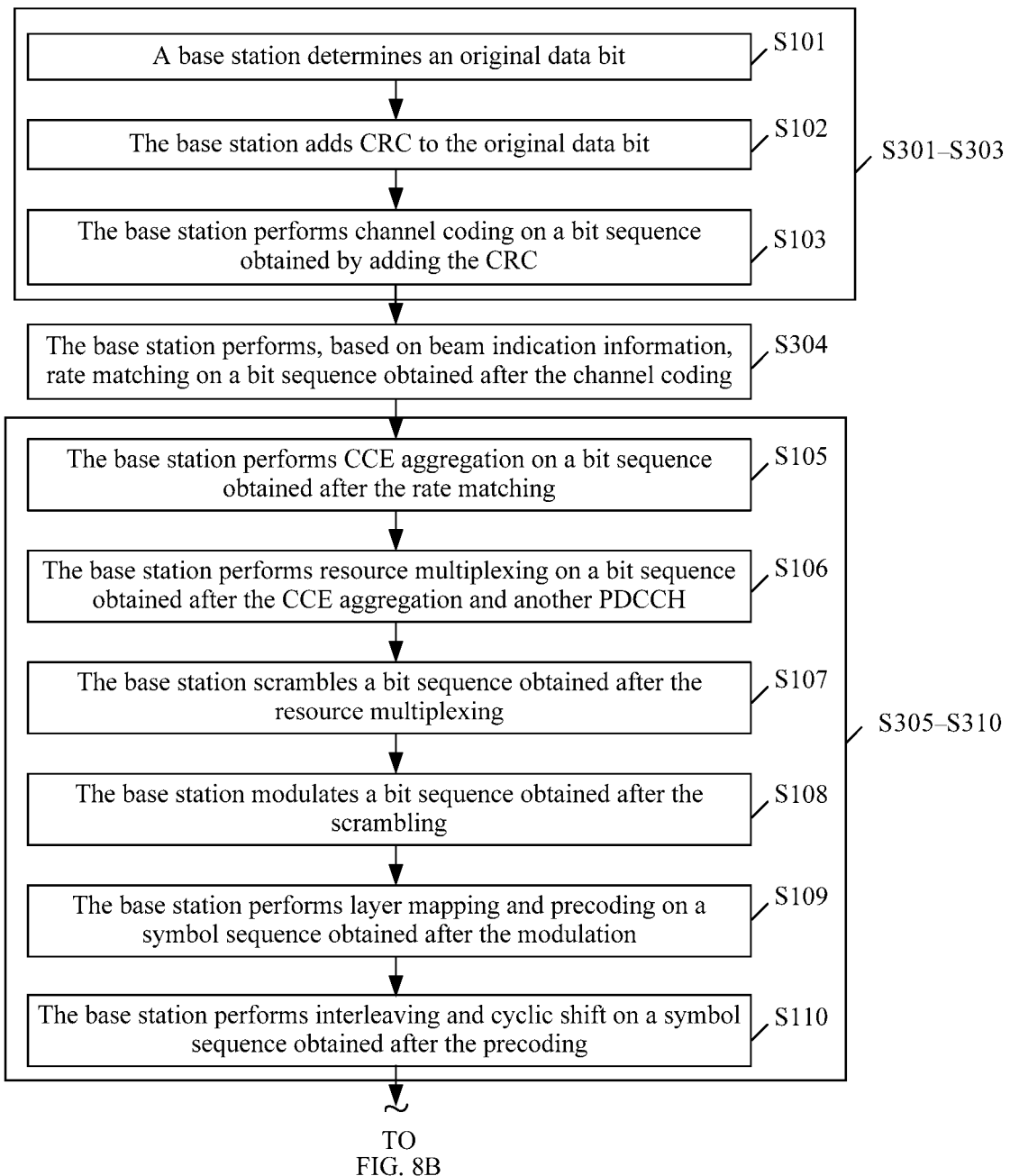
FIG. 8A and FIG. 8B are a schematic flowchart of an information transmission method according to an embodiment of this application.
Figure 8B:
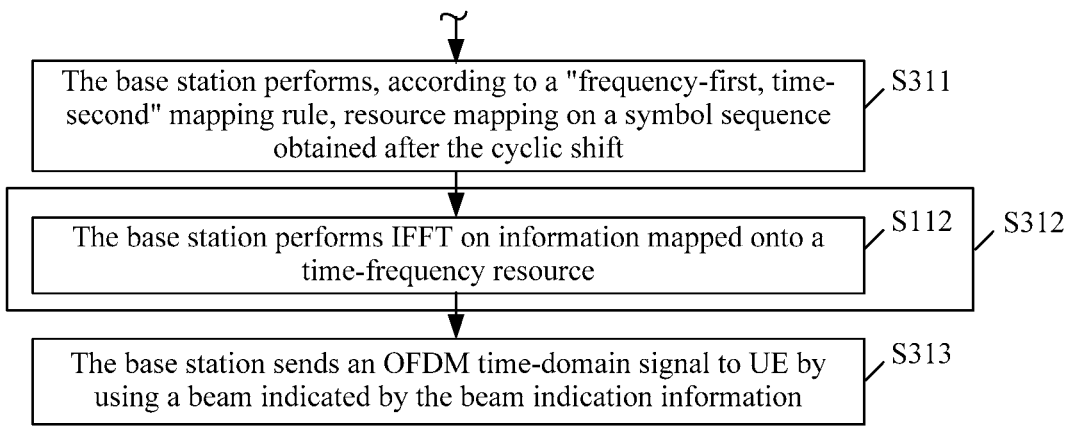

FIG. 8A and FIG. 8B are a schematic flowchart of an information transmission method according to an embodiment of this application. It should be noted that in FIG. 8A and FIG. 8B, descriptions are made by using an example in which a base station processes a PDCCH transmitted on one beam. The method may include the following steps S301 to S312.

It should be understood that some steps of the following steps S301 to S312 are optional, and an execution order can be adjusted. This is not limited in the present invention.

S301 to S303: Refer to S101 to S103 currently used in LTE. Details are not described herein again.

S304: The base station performs, based on beam indication information, rate matching on a bit sequence obtained after the channel coding.

Figure 9:
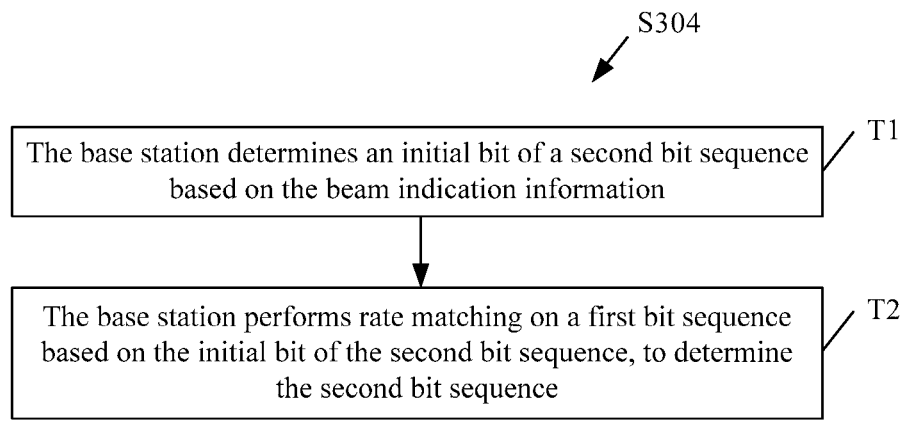
FIG. 9 is a schematic flowchart of performing a scrambling operation by a base station according to an embodiment of this application.

In an example, as shown in FIG. 9, S304 may include the following steps T1 and T2.

T1: The base station determines an initial bit of a second bit sequence based on the beam indication information.

Specifically, the base station determines a location of the initial bit of the second bit sequence in a first bit sequence based on the beam indication information. The first bit sequence may be a bit sequence obtained after the channel coding, for example, a bit sequence directly output after the channel coding, or a bit sequence output after the channel coding and another processing operation (for example, an interleaving operation). The second bit sequence is a bit sequence obtained after the rate matching.

T2: The base station performs rate matching on the first bit sequence based on the initial bit of the second bit sequence, to determine the second bit sequence.

It may be understood that after the initial bit of the second bit sequence is obtained, manners for obtaining other bits in the second bit sequence are not limited in this application. For example, the base station may obtain a preset quantity of consecutive bits starting from the initial bit, as the second bit sequence; or may obtain a preset quantity of odd-number or even-number bits starting from the initial bit, as the second bit sequence; or the like. Other examples are not enumerated herein.

Figure 10:
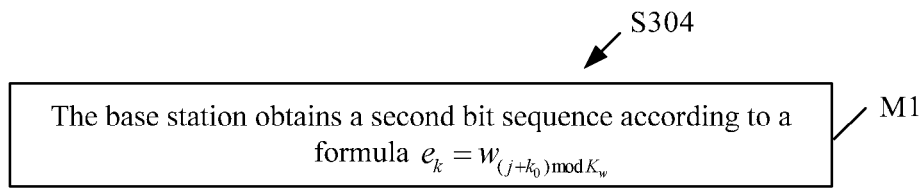
FIG. 10 is another schematic flowchart of performing a scrambling operation by a base station according to an embodiment of this application.

In an example, as shown in FIG. 10, S304 may include the following step M1.

M1: The base station obtains the second bit sequence according to a formula $e_k = w_{(j+k_0) \bmod K_w}$, where $e_k$ represents the $k^{th}$ element in the second bit sequence, k is an integer, $w_{(j+k_0) \bmod K_w}$ represents the $(j+k_0) \bmod K_w{}^{th}$ element in the first bit sequence, k is in one-to-one correspondence with j, $k_0$ represents a value related to the beam indication information, and Kw represents a length of the first bit sequence.

In an example, based on an implementation architecture of the rate matching shown in FIG. 1a, the steps shown in FIG. 9 and FIG. 10 may be considered as specific implementations of the selector. That is, step 3) in step S104 above may be replaced with the foregoing step M1. In this case, the first bit sequence is an output sequence of the annular buffer.

k=0, 1, . . . , and E, k<E, and $w_{(j+k_0) \bmod K_w} \neq <NULL>$. E is determined by an aggregation level. When aggregation levels are 1, 2, 4, and 8, respective Es are 72, 144, 288, and 576.

$k_0$ is a value related to a beam. For example, $$k_0 = R_{subblock}^{TC} \cdot \left(2 \cdot \left\lceil \frac{K_w}{8 R_{subblock}^{TC}} \right\rceil \cdot Beam_{idx} + 2\right).$$

It may be understood that during specific implementation, the base station and the UE may agree on a related relationship between $k_0$ and the beam indication information in advance. For a specific example, refer to the following description.

In an optional embodiment, E may be a value related to a beam. For example, E is related to beam quality.

A plurality of groups of available beam pairs may be maintained between the base station and the UE, and quality of each beam may be measured by the UE and fed back by the UE to the base station. The beam quality may be reflected in a plurality of manners, for example, reflected by using reference signal receiving power (RSRP). A correlation between the beam quality and the aggregation level may be reflected as follows: Assuming that the aggregation levels are 1, 2, 4, and 8, when the base station sends a PDCCH to the UE by using a plurality of beams, if a difference between quality of any two beams is X1 or larger, a difference between aggregation levels of the PDCCH sent on the two beams may be 1; if a difference between quality of any two beams is X2 or larger, a difference between aggregation levels of the PDCCHs sent on the two beams may be 2; and if a difference between quality of any two beams is X3 or larger, a difference between aggregation levels of the PDCCH sent on the two beams may be 3, where X1<X2<X3.

It may be understood that, as can be learned from S304, the rate matching operation provided in this application is related to the beam indication information, each piece of beam indication information is used to indicate one beam, and different beam indication information indicates different beams. Each beam may be indicated by one or more pieces of beam indication information, and different beams may be indicated by different beam indication information. A specific implementation of the beam indication information is not limited in this application, and some optional manners are enumerated below:

Manner 1: The beam indication information is a relative number of a beam.

Figure 11A:
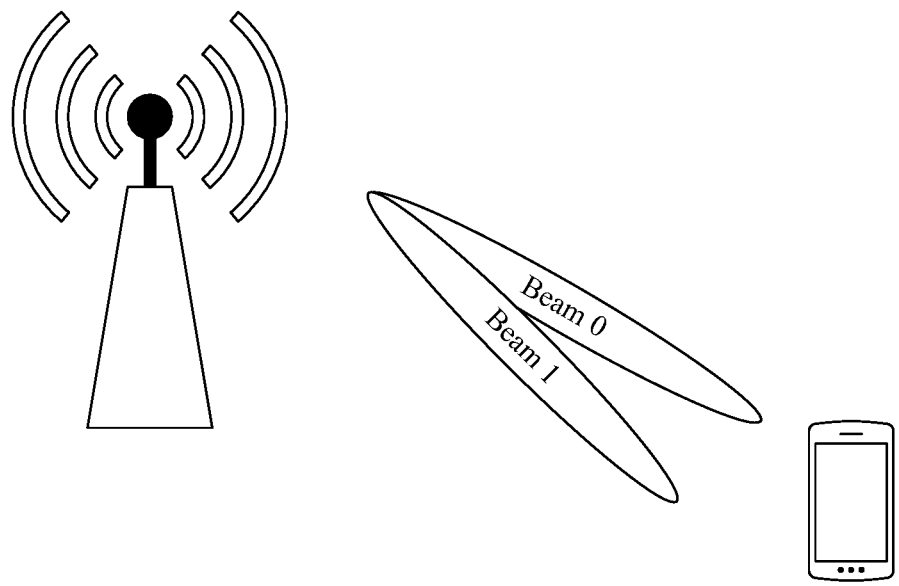
FIG. 11a is a schematic diagram of a type of beam indication information according to an embodiment of this application.

Assuming that relative numbers of beams used by the base station to send a PDCCH to the UE are $beam_{idx}$= {0, 1, . . . }, where each number represents one physical beam, as shown in FIG. 11a, a possible correlation between $k_0$ and the relative number of the beam is $k_0$=$beam_{idx}$. For example, as shown in FIG. 11a, the base station uses two beams in total to send a PDCCH to the UE, where relative numbers of the two beams may be 0 and 1. In this case, $k_0$=0 may be used to obtain a bit sequence obtained through rate matching corresponding to the beam 0, and $k_0$=1 is used to obtain a bit sequence obtained through rate matching corresponding to the beam 1. Another possible correlation between $k_0$ and the relative number of the beam is $$k_0 = R_{subblock}^{TC} \cdot \left(2 \cdot \left\lceil \frac{K_w}{8 R_{subblock}^{TC}} \right\rceil \cdot (Beam_{idx} \bmod N) + 2\right),$$

where N is a predefined or configurable integer, for example, N=4.

Manner 2: The beam indication information is a logical number of a beam.

Figure 11B:
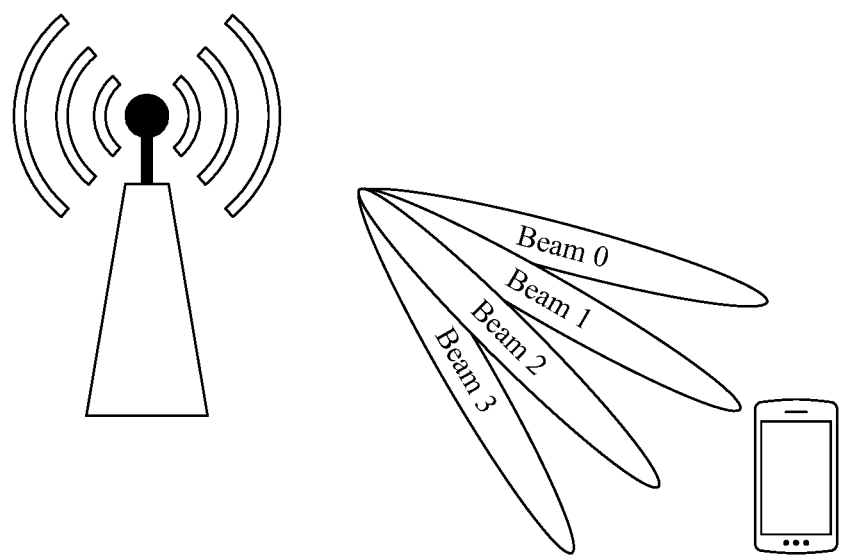
FIG. 11b is a schematic diagram of another type of beam indication information according to an embodiment of this application.

Assuming that logical numbers of transmit beams of the base station are $beam_{idx}=\{0, 1, \ldots\}$, where each number represents one physical beam, as shown in FIG. 11b, a possible correlation between $k_0$ and the logical number of the beam is $k_0=beam_{idx}$. For example, as shown in FIG. 11b, numbers of transmit beams of the base station are 0, 1, 2, and 3. If the base station uses the beam 1 and the beam 2 to send a PDCCH to the UE, $k_0=1$ may be used to obtain a bit sequence obtained through the rate matching corresponding to the beam 1, and $k_0=2$ is used to obtain a bit sequence obtained through rate matching corresponding to the beam 2. Another possible correlation between $k_0$ and the logical number of the beam is $$k_0 = R_{subblock}^{TC} \cdot \left(2 \cdot \left\lceil \frac{K_w}{8R_{subblock}^{TC}} \right\rceil \cdot (Beam_{idx} \bmod N) + 2\right),$$

where N is a predefined or configurable integer, for example, N=4.

Manner 3: The beam indication information is a physical number of a beam.

Figure 11C:
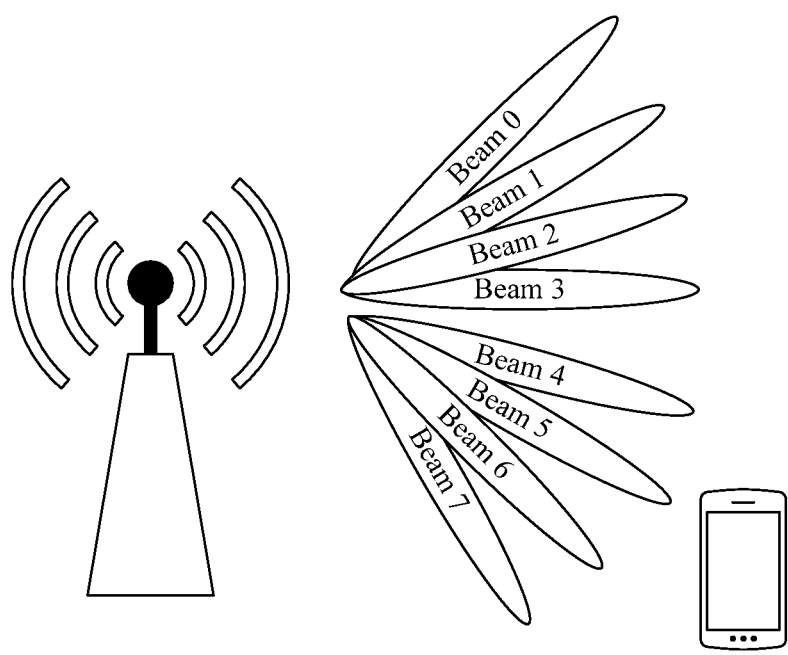
FIG. 11c is a schematic diagram of another type of beam indication information according to an embodiment of this application.

Assuming that physical numbers of transmit beams of the base station are $beam_{idx}=\{0, 1, \ldots\}$, where each number represents one physical beam, a possible correlation between $k_0$ and the physical number of the beam is $k_0=beam_{idx}$ mod N, where N is a predefined or configurable integer. It is assumed that the base station uses eight beams in total to serve an entire cell, as shown in FIG. 11c. Based on FIG. 11c, if N=2, and the base station uses a beam 5 and a beam 6 to send a PDCCH to the UE, $k_0=1$ may be used to obtain a bit sequence obtained through rate matching corresponding to the beam 5, and $k_0=0$ is used to obtain a bit sequence obtained through rate matching corresponding to the beam 6. Another possible correlation between $k_0$ and the physical number of the beam is $$k_0 = R_{subblock}^{TC} \cdot \left(2 \cdot \left\lceil \frac{K_w}{8R_{subblock}^{TC}} \right\rceil \cdot (Beam_{idx} \bmod N) + 2\right),$$

where N is a predefined or configurable integer, for example, N=4.

Manner 4: The beam indication information is a port number.

One beam may correspond to one or more port numbers. Therefore, a beam may be indicated by using a port number corresponding to the beam. Optionally, port numbers corresponding to a beam may form a port group, and a logical number (a port group ID) is allocated to each port group. On this basis, assuming that $beam_{idx}=\{0, 1, \ldots\}$, where each ID represents one port group, a possible correlation between $k_0$ and the port number is $k_0=beam_{idx}$ mod N, where N is a predefined or configurable integer. For example, if N=2, and the base station uses a beam 2 and a beam 3 to send a PDCCH to the UE, $k_0=0$ may be used to obtain a bit sequence obtained through rate matching corresponding to the beam 2, and $k_0=1$ is used to obtain a bit sequence obtained through rate matching corresponding to the beam 3. Another possible correlation between $k_0$ and the port number is $$k_0 = R_{subblock}^{TC} \cdot \left(2 \cdot \left\lceil \frac{K_w}{8R_{subblock}^{TC}} \right\rceil \cdot (Beam_{idx} \bmod N) + 2\right),$$

where N is a predefined or configurable integer, for example, N=4.

Manner 5: The beam indication information is quasi co-location (QCL) information.

Quasi co-location is used to indicate that a plurality of resources have one or more same or similar communication features. For a plurality of resources having a co-location relationship, same or similar communication configurations may be used. For example, if two antenna ports have a co-location relationship, large-scale characteristics of a channel over which a symbol on one port is conveyed may be inferred from large-scale characteristics of a channel over which a symbol on the other port is conveyed. The large-scale characteristics may include: delay spread, an average delay, Doppler spread, Doppler shift, an average gain, a receive beam number of a terminal device, transmit/receive channel correlation, a receiving angle of arrival, spatial correlation of an antenna of a receiver, and the like.

On this basis, a beam may be indicated by using a resource of another signal sent on the beam sending the PDCCH. Optionally, the signal may be a reference signal, for example, a CSI-RS. The "resource" herein may include, but is not limited to, at least one of the following information: a time-frequency resource, a quantity of ports, a period, an offset, and the like.

It may be understood that if the base station sends the PDCCH to the UE by using a beam, the base station has sent a CSI-RS by using the beam. This is because the base station usually needs to first send the CSI-RS to the UE, to perform a channel measurement; and then send the PDCCH to the UE based on a channel measurement result. On this basis, it may be learned that the UE can learn which beam or beams are used by the base station to send the PDCCH, provided that the base station notifies the UE of a port number and/or a resource number used for the CSI-RS.

Figure 11D:
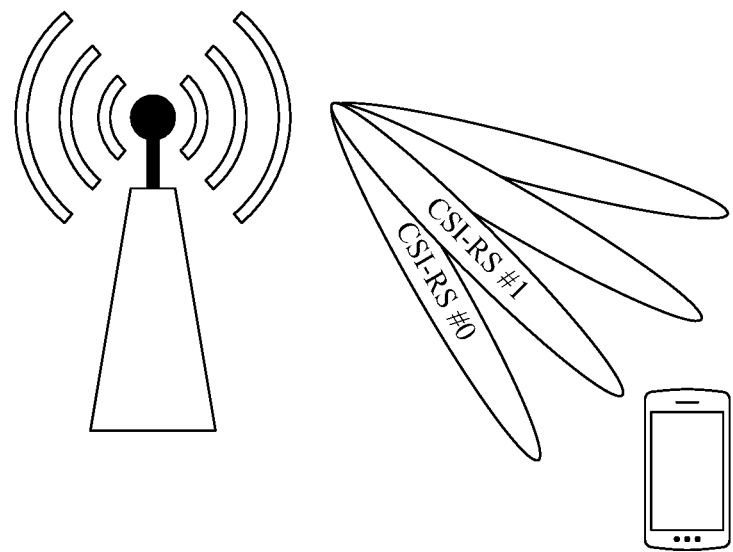
FIG. 11d is a schematic diagram of another type of beam indication information according to an embodiment of this application.

FIG. 11d shows a correspondence between a CSI-RS resource and a beam.

Optionally, a CSI-RS resource number may be a resource ID, or a resource ID+a port ID (port ID). In this case, assuming that $beam_{idx}=\{0, 1, \ldots\}$, where each ID represents one CSI-RS resource, a possible correlation between $k_0$ and the CSI-RS resource is $k_0=beam_{idx}$ mod N, where N is a predefined or configurable integer. Another possible correlation between $k_0$ and the CSI-RS resource is $$k_0 = R_{subblock}^{TC} \cdot \left(2 \cdot \left\lceil \frac{K_w}{8R_{subblock}^{TC}} \right\rceil \cdot (Beam_{idx} \bmod N) + 2\right),$$

where N is a predefined or configurable integer, for example, N=4.

For example, as shown in FIG. 11d, if numbers of CSI-RS resources used by the base station to send a CSI-RS to the UE are #0 and #1, a PDCCH is sent to the UE by using beams sending the CSI-RS, and N=2, $k_0=0$ may be used to obtain a bit sequence obtained through rate matching on a beam corresponding to the CSI-RS resource number #0, and $k_0=1$ is used to obtain a bit sequence obtained through rate matching on a beam corresponding to the CSI-RS resource number #1.

Manner 6: The beam indication information is beam pair link (BPL) information.

Figure 11E:
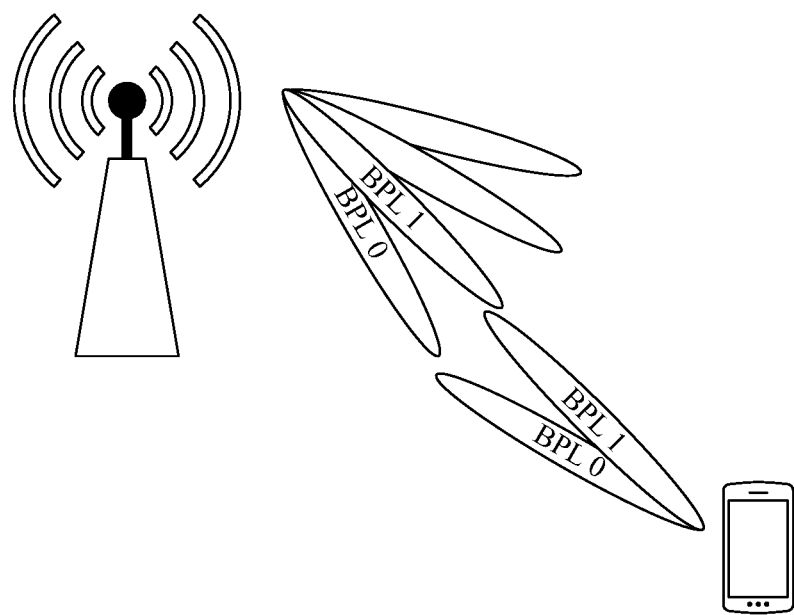
FIG. 11e is a schematic diagram of another type of beam indication information according to an embodiment of this application.

The BPL information may be a BPL number or the like. Assuming that $beam_{idx}=\{0, 1, \ldots\}$, where each number represents one BPL, as shown in FIG. 11e, a possible correlation between $k_0$ and the BPL information is $k_0=beam_{idx}$. For example, as shown in FIG. 11e, if the base station uses a beam pair 0 and a beam pair 1 to send a PDCCH to the UE, $k_0=0$ may be used to obtain a bit sequence obtained through rate matching corresponding to the beam pair 0, and $k_0=1$ is used to obtain a bit sequence obtained through rate matching corresponding to the beam pair 1. Another possible correlation between $k_0$ and the BPL information is $$k_0 = R_{subblock}^{TC} \cdot \left(2 \cdot \left\lceil \frac{K_w}{8R_{subblock}^{TC}} \right\rceil \cdot (Beam_{idx} \bmod N) + 2\right),$$

where N is a predefined or configurable integer, for example, N=4.

Manner 7: The beam indication information is a UE group. UEs within a coverage range of a beam form a UE group, each UE group may include one or more UEs, and one UE may belong to one or more UE groups.

Figure 11F:
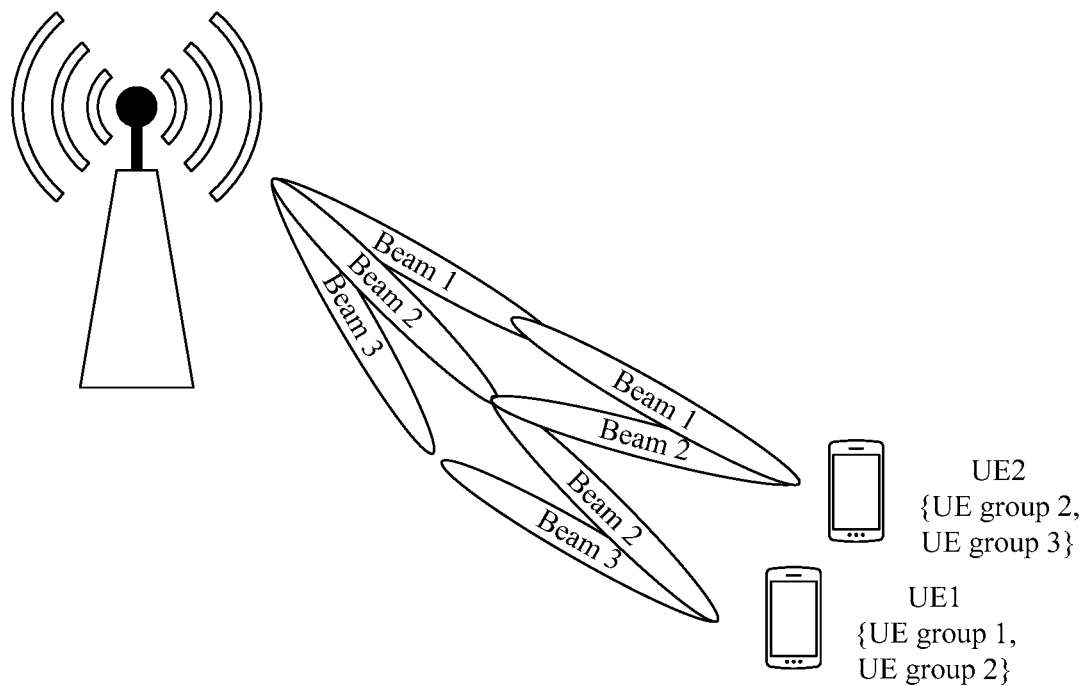
FIG. 11f is a schematic diagram of another type of beam indication information according to an embodiment of this application.

As shown in FIG. 11f, a UE group 1 corresponding to a beam 1 includes UE1, a UE group 2 corresponding to a beam 2 includes the UE1 and UE2, and a UE group 3 corresponding to a beam 3 includes the UE2. In this case, assuming that $beam_{idx}=\{0, 1, \ldots\}$, where each number represents one UE group, a possible correlation between $k_0$ and the UE group is $k_0=beam_{idx}$. For example, as shown in FIG. 11f, the base station may use $k_0=1$ to obtain a bit sequence obtained through rate matching corresponding to the beam 1, use $k_0=2$ to obtain a bit sequence obtained through rate matching corresponding to the beam 2, and use $k_0=3$ to obtain a bit sequence obtained through rate matching corresponding to the beam 3. Another possible correlation between $k_0$ and the UE group is $$k_0 = R_{subblock}^{TC} \cdot \left(2 \cdot \left\lceil \frac{K_w}{8R_{subblock}^{TC}} \right\rceil \cdot (Beam_{idx} \bmod N) + 2\right),$$

where N is a predefined or configurable integer, for example, N=4.

Manner 8: The beam indication information is a time-domain symbol.

Figure 11G:
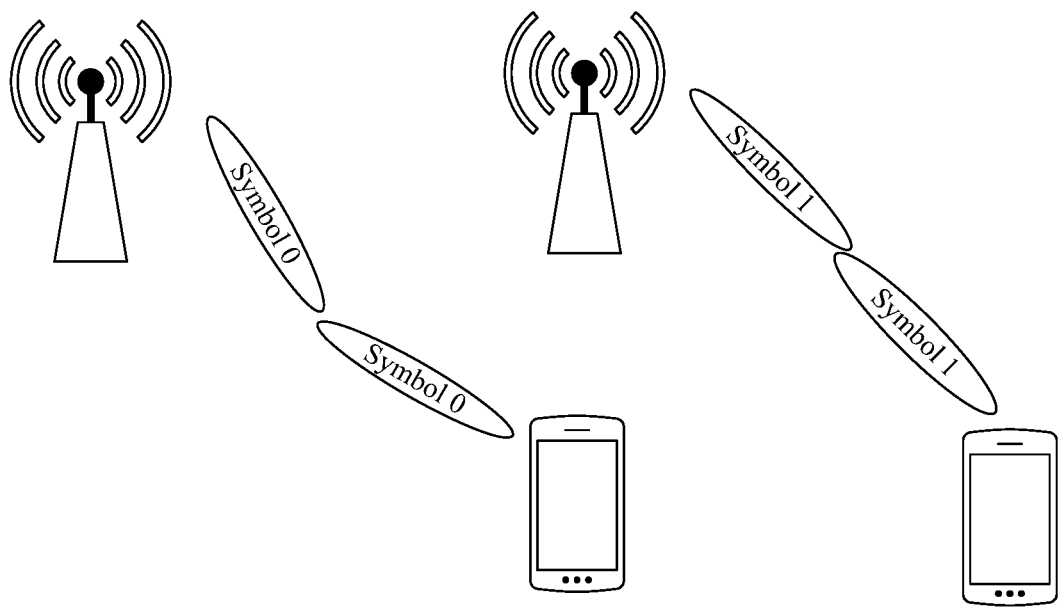
FIG. 11g is a schematic diagram of another type of beam indication information according to an embodiment of this application.

The time-domain symbol is an OFDM symbol occupied for sending the beam. This manner is applicable to a scenario in which the base station uses a plurality of beams to send a PDCCH to a same UE in different symbols, and only one beam is used in each symbol to send the PDCCH to the UE. As shown in FIG. 11g, the base station uses one beam to send the PDCCH to the UE in a symbol 0, and uses another beam to send the PDCCH to the UE in a symbol 1.

Assuming that $beam_{idx}=\{0, 1, \ldots\}$, where each number represents a symbol time, another possible correlation between $k_0$ and the time-domain symbol is $k_0=\lfloor beam_{idx}/2 \rfloor 2^N$, where N is a predefined or configurable integer, for example, N=9. Another optional correlation between $k_0$ and the time-domain symbol is $$k_0 = R_{subblock}^{TC} \cdot \left(2 \cdot \left\lceil \frac{K_w}{8R_{subblock}^{TC}} \right\rceil \cdot (Beam_{idx} \bmod N) + 2\right),$$

where N is a predefined or configurable integer, for example, N=4.

It may be understood that the manners enumerated above are described by using an example in which the beam indication information includes only one type of information. During specific implementation, the beam indication information may alternatively be a combination of at least two pieces of the information described above, for example, an example in manner 5. Certainly, the beam indication information is not limited to the information described above, and other information is not enumerated in this application.

It should be noted that in the technical solutions provided in this application, beams are taken into account when the base station performs a scrambling operation. However, it is not limited in this application that bit sequences obtained through rate matching corresponding to different beams are necessarily different. In other words, the bit sequences obtained through the rate matching corresponding to different beams may be the same, or may be different.

It may be understood that a beam for communication between the base station and one UE may change as the UE moves, and a change rule of the used beam is not limited in this application. Therefore, in this case, the beam indication information is not a fixed value. On this basis, the base station may notify the UE of the beam indication information through signaling. An execution order of this step and other steps in FIG. 8A and FIG. 8B are not limited in the embodiments of this application. Optionally, this step may be performed before S301. It should be noted that the signaling used for sending the beam indication information may be newly designed signaling, or signaling used in the prior art.

Optionally, the base station may send the beam indication information to the UE through radio resource control (RRC) signaling, medium access control (MAC) signaling, downlink control information (DCI), or uplink control information (UCI). For example, sending, by the base station, the beam indication information to the UE through the RRC signaling or the MAC signaling is applicable to a scenario in which a beam changes relatively slowly. Sending, by the base station, the beam indication information to the UE by using the DCI is applicable to a scenario in which a beam changes relatively quickly.

S305 to S310: Refer to S105 to S110 in LTE. Details are not described herein again.

S311: The base station performs, according to a "frequency-first, time-second" mapping rule, resource mapping on a symbol sequence obtained after the cyclic shift.

The technical solution provided in this embodiment of this application is particularly applicable to a multi-beam transmission scenario. In the multi-beam transmission scenario, the mapping rule may be "frequency-first, time-second". This can avoid the following problem: In a scenario in which a beam occupies one symbol, UE in a direction of the beam cannot receive all information transmitted on different beams due to a "time-first, frequency-second" mapping rule. It may be understood that if one beam occupies a plurality of symbols, information transmitted by using the beam may be mapped according to the "time-first, frequency-second" mapping rule, or may be mapped according to the "frequency-first, time-second" mapping rule.

Using an antenna port as an example, resource mapping means mapping $\overline{w}(i)$ onto a REG (k', l') corresponding to the port. For descriptions about $\overline{w}(i)$, refer to S111 described above.

If a plurality of beams occupy one symbol, as shown in FIG. 6, performing, by the base station, resource mapping on symbol sequences corresponding to the plurality of beams may be: mapping $\overline{w}(0)$ onto the REG (0, 0), mapping $\overline{w}(1)$ onto the REG (1, 0), mapping $\overline{w}(2)$ onto the REG (2, 0), mapping $\overline{w}(3)$ onto the REG (3, 0), . . . .

If a plurality of beams occupy a plurality of symbols, as shown in FIG. 7, in the symbol 0, the base station maps $\overline{w}(0)$ onto the REG (0, 0), maps $\overline{w}(1)$ onto the REG (1, 0), maps $\overline{w}(2)$ onto the REG (2, 0), maps $\overline{w}(3)$ onto the REG (3, 0), . . . . In the symbol 1, $\overline{w}(0)$ is mapped onto a REG (0, 1), $\overline{w}(1)$ is mapped onto a REG (1, 1), $\overline{w}(2)$ is mapped onto a REG (2, 1), $\overline{w}(3)$ is mapped onto a REG (3, 1), . . . .

S312: Refer to step S112 in LTE. Details are not described herein again.

S313: The base station sends an OFDM time-domain signal to the UE by using a beam indicated by the beam indication information.

S301 to S313 are described by using a process for processing a PDCCH sent on one beam by the base station as an example. In a multi-beam scenario, the base station only needs to perform the foregoing process for a plurality of times. It should be understood that some of the foregoing steps may be optional, or an execution order may be adjusted and the steps are not performed completely according to an execution order in LTE. This is not limited in the embodiments of the present invention.

In this embodiment, beams are taken into account in a process in which the base station performs the rate matching operation. In this way, bit sequences obtained by performing rate matching on PDCCHs sent on different beams may be different. In other words, versions of the PDCCHs transmitted on different beams may be different. In this way, performing soft combination on a UE side can increase a signal-to-noise ratio (SNR) and reduce a code rate, thereby improving robustness of the control channel.

Figure 12:
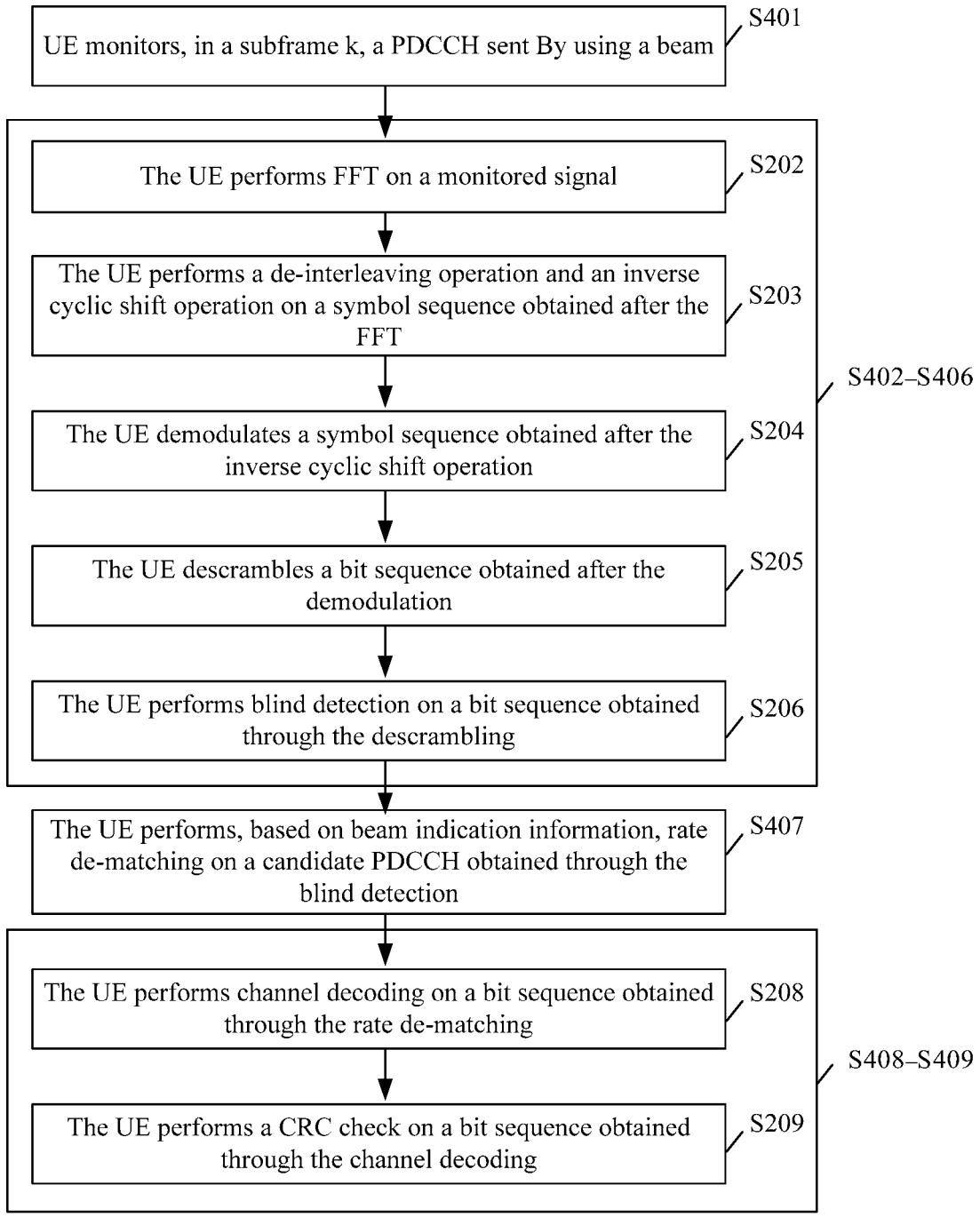
FIG. 12 is a schematic flowchart of another information transmission method according to an embodiment of this application.

FIG. 12 is a schematic flowchart of an information transmission method according to an embodiment of this application. It should be noted that in FIG. 12, descriptions are made by using an example in which UE processes a PDCCH transmitted on one beam. The method may include the following steps S401 to S409.

S401: The UE monitors, in a subframe k, a PDCCH sent by using a beam. A signal monitored by the UE (that is, a signal received by the UE) is a radio signal carried by an OFDM waveform, that is, an OFDM time-domain signal.

S402 to S406 are the same as S202 to S206.

S407: The UE performs, based on beam indication information, rate de-matching on a candidate PDCCH obtained through the blind detection, where the beam indication information is used to indicate the beam in S401.

Figure 13:
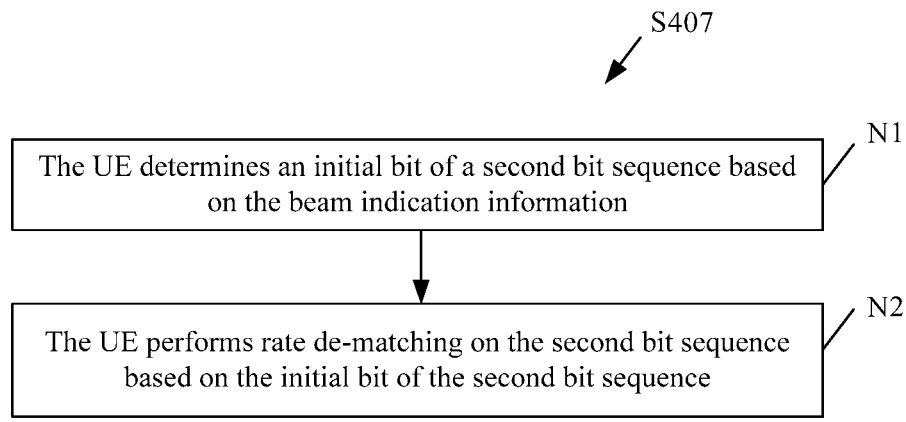
FIG. 13 is a schematic flowchart of performing a descrambling operation by UE according to an embodiment of this application.

As shown in FIG. 13, S407 includes the following steps N1 and N2.

N1: The UE determines an initial bit of a second bit sequence based on the beam indication information.

The second bit sequence herein may be considered as a bit sequence obtained after the rate de-matching on the candidate PDCCH.

N2: The UE performs rate de-matching on the second bit sequence based on the initial bit of the second bit sequence.

Specific implementation processes of steps N1 and N2 correspond to the specific example of S304. Therefore, for the specific implementation processes of steps N1 and N2, refer to the foregoing descriptions. Details are not described herein again. In addition, for descriptions about the beam indication information, reference may also be made to the foregoing descriptions.

In addition, the method may further include: receiving, by the UE, the beam indication information through RRC signaling, MAC signaling, or DCI. Specific signaling through which the UE receives the beam indication information is related to signaling through which the base station sends the beam indication information. For example, if the base station sends the beam indication information through the RRC signaling, the UE receives the beam indication information through the RRC signaling. Other examples are not enumerated.

S408 and S409: Refer to steps S208 and S209 in LTE. Details are not described herein again.

It may be understood that if a PDCCH monitored on a single beam is incorrectly decoded, the UE can try to perform soft combination on bit sequences obtained by performing demodulation and rate de-matching on information received on two or more than two beams, and then perform decoding. Specific algorithms of the soft combination vary with coding schemes. For example, reference may be made to turbo coding, HARQ-IR soft combination, and the like in LTE. It may be understood that in this case, the UE needs to store a version of received information corresponding to the PDCCH that is incorrectly decoded (that is, information about a bit sequence on which rate de-matching is to be performed), for the soft combination. The PDCCH is incorrectly decoded possibly because the PDCCH is not targeted for the UE, or interference is received during transmission. This is not limited in this application.

It should be understood that some of the foregoing steps may be optional, or an execution order may be adjusted and the steps are not performed completely according to an execution order in LTE. This is not limited in the embodiments of the present invention.

In this embodiment, beams are taken into account in a process in which the UE performs the rate de-matching operation. The rate de-matching process corresponds to the rate matching process in the embodiment shown in FIG. 8A and FIG. 8B. Therefore, for explanations about related content of the rate de-matching process and beneficial effects that can be achieved, refer to the corresponding part in the embodiment shown in FIG. 8A and FIG. 8B. Details are not described herein again.

The foregoing mainly describes the solutions provided in the embodiments of this application from a perspective of interaction between various network elements. It may be understood that, to implement the foregoing functions, each network element, for example, a network device (such as a base station) or a terminal device (such as UE), includes corresponding hardware structures and/or software modules for performing the functions. A person skilled in the art should be easily aware that units and algorithm steps in the examples described with reference to the embodiments disclosed in this specification may be implemented by hardware or a combination of hardware and computer software. Whether a function is performed by hardware or hardware driven by computer software depends on particular applications and designed constraints of the technical solutions. A person skilled in the art may use different methods to implement the described functions for each particular application, but it should not be considered that the implementation goes beyond the scope of this application.

In the embodiments of this application, function modules of the network device or the terminal device may be obtained through division based on the foregoing method examples. For example, each function module may be divided in correspondence to functions, or at least two functions may be integrated into one processing module.

The integrated module may be implemented in a form of hardware, or may be implemented in a form of a software function module. It should be noted that the module division in the embodiments of this application is an example and is merely logical function division. There may be another division manner in actual implementation. Descriptions are made below by using an example in which the function modules are obtained through device in correspondence to the functions.

Figure 14:
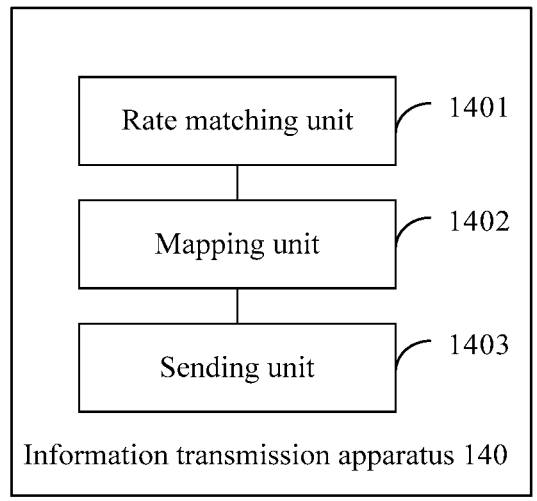
FIG. 14 is a schematic structural diagram of an information transmission apparatus according to an embodiment of this application.

FIG. 14 is a schematic structural diagram of an information transmission apparatus 140. The information transmission apparatus 140 may be the above-mentioned network device 100 (corresponding to downlink), for example, a base station; may be a terminal device (corresponding to uplink), for example, UE; or may be a chip. The information transmission apparatus 140 may include a rate matching unit 1401, a mapping unit 1402, and a sending unit 1403. The rate matching unit 1401 may be configured to perform S304 in FIG. 8A and FIG. 8B, the steps in FIG. 9, and the step in FIG. 10, and/or is configured to support other processes of the technology described in this specification. The mapping unit 1402 may be configured to perform S311 in FIG. 8A and FIG. 8B, and/or is configured to support other processes of the technology described in this specification. The sending unit 1403 may be configured to perform S311 in FIG. 8A and FIG. 8B, and/or is configured to support other processes of the technology described in this specification. All related content of the steps in the foregoing method embodiments may be cited in function descriptions about corresponding function modules, and details are not described herein again.

Figure 15:
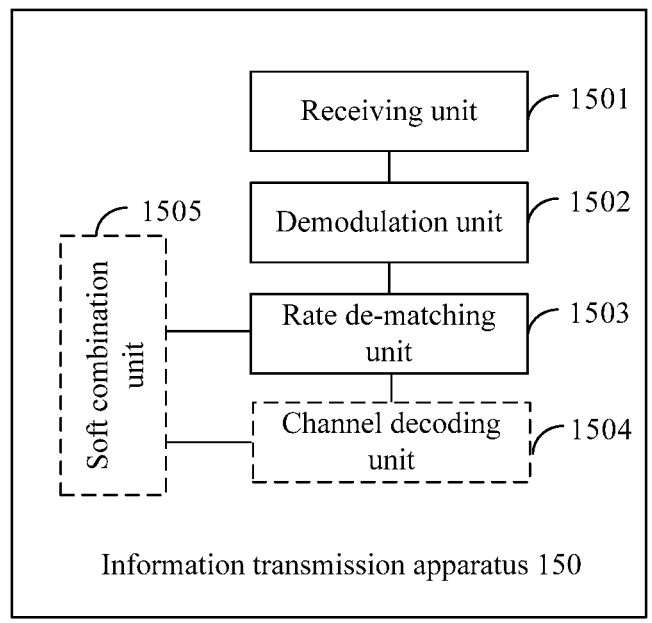
FIG. 15 is a schematic structural diagram of another information transmission apparatus according to an embodiment of this application.

FIG. 15 is a schematic structural diagram of an information transmission apparatus 150. The information transmission apparatus 150 may be the above-mentioned terminal device 200, for example, UE; may be a network device, for example, a base station; or may be a chip. The information transmission apparatus 150 may include a receiving unit 1501, a demodulation unit 1502, and a rate de-matching unit 1503. The receiving unit 1501 may be configured to perform S401 in FIG. 12, and/or is configured to support other processes of the technology described in this specification. The demodulation unit 1502 may be configured to perform S406 in FIG. 12, and/or is configured to support other processes of the technology described in this specification. Optionally, the information transmission apparatus 150 may further include a channel decoding unit 1504 and a soft combination unit 1505. The channel decoding unit 1504 may be configured to perform channel decoding on a bit sequence obtained after rate de-matching. The soft combination unit 1505 may perform soft combination on bit sequences obtained by performing demodulating and rate de-matching on information received on at least two beams, thereby improving channel decoding correctness.

In the embodiments of this application, the information transmission apparatus 140 and the information transmission apparatus 150 are presented in a form in which the function modules are divided in correspondence to the functions, or are presented in a form in which the function modules are divided through integration. The "module" herein may be an application-specific integrated circuit (ASIC), a processor and a memory that execute one or more software or firmware programs, an integrated logic circuit, and/or another component that can provide the foregoing function.

Figure 16:
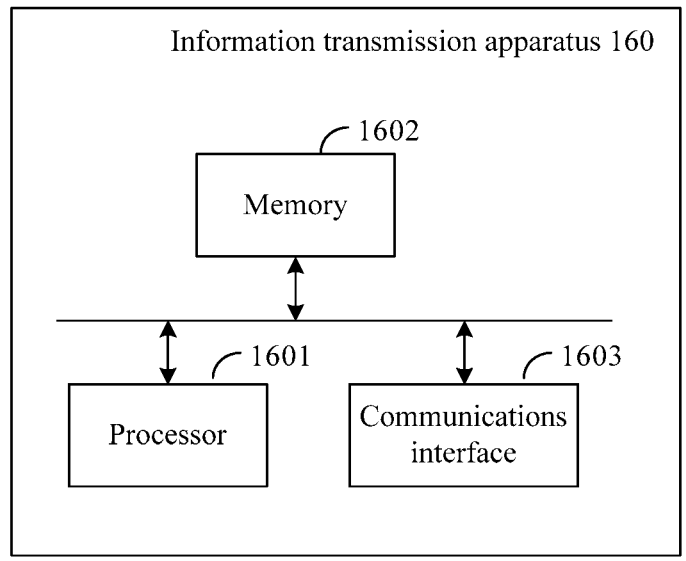
FIG. 16 is a schematic structural diagram of another information transmission apparatus according to an embodiment of this application.

In a simple embodiment, a person skilled in the art can figure out that either of the information transmission apparatus 140 and the information transmission apparatus 150 may be implemented through a structure shown in FIG. 16.

As shown in FIG. 16, an information transmission apparatus 160 may include a memory 1601 and a processor 1602. Optionally, the information transmission apparatus may further include a communications interface 1603. The memory 1602 is configured to store a computer executable instruction. When the information transmission apparatus 160 operates, the processor 1601 executes the computer executable instruction stored in the memory 1602, so that the information transmission apparatus 160 performs the information transmission method provided in the embodiments of this application. For the specific information transmission method, refer to related descriptions above and in the accompanying drawings. Details are not described herein again.

In an example, the sending unit 1403 may correspond to a communications interface 1603 in FIG. 16. The rate matching unit 1401 and the mapping unit 1402 may be embedded into or independent of the memory 1602 of the information transmission apparatus 160 in a form of hardware.

In another example, the receiving unit 1501 may correspond to a communications interface 1603 in FIG. 16. The demodulation unit 1502, the rate de-matching unit 1503, the channel decoding unit 1504, and the soft combination unit 1505 may be embedded into or independent of the memory 1601 of the information transmission apparatus 160 in a form of hardware.

Optionally, the information transmission apparatus 160 may be a field-programmable gate array (FPGA), an application-specific integrated circuit (ASIC), a system on chip (SoC), a central processing unit (CPU), a network processor (NP), a digital signal processor (DSP), or a micro controller unit (MCU), a programmable logic device (PLD), or another integrated chip.

An embodiment of this application further provides a storage medium. The storage medium may include a memory 1602.

The information transmission apparatus provided in the embodiments of this application may be configured to perform the foregoing information transmission method. Therefore, for technical effects that can be derived by the information transmission apparatus, refer to the foregoing method embodiments. Details are not described in this embodiment of this application again.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, the disclosed content, and the appended claims. In the claims, the term "comprising" (comprising) does not exclude another component or another step, and "a" or "one" does not exclude a case of multiple. A single processor or another unit may implement functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the appended claims, and are considered as any of or all modifications, variations, combinations, or equivalents that cover the scope of this application. Obviously, a person skilled in the art can make various modifications and variations to this application without departing from the spirit and scope of this application. In this way, this application is also intended to cover these modifications and variations provided that these modifications and variations of this application fall within the scope of the claims of this application and their equivalent technologies.

What is claimed is:

1. An information transmission method, comprising:
    performing, by a transmit end, rate matching on a first bit sequence based on beam indication information, to obtain a second bit sequence, wherein the first bit sequence is a bit sequence obtained by performing channel coding on an original bit sequence;
    mapping, by the transmit end, the second bit sequence onto a time-frequency resource; and
    sending, by the transmit end, to a receive end by using a beam indicated by the beam indication information, the second bit sequence that is mapped onto the time-frequency resource,
    wherein the performing rate matching on the first bit sequence based on the beam indication information, to obtain the second bit sequence comprises:
    obtaining, by the transmit end, the second bit sequence according to a formula $e_k = w_{(j+k_0) \bmod K_w}$, wherein $e_k$ represents the $k^{th}$ element in the second bit sequence, k is an integer, $w_{(j+k_0) \bmod K_w}$ represents the $(j+k_0) \bmod K_w{}^{th}$ element in the first bit sequence, k is in one-to-one correspondence with j, $k_0$ represents a value related to the beam indication information, and Kw represents a length of the first bit sequence.

2. The method according to claim 1, wherein the performing rate matching on the first bit sequence based on the beam indication information, to obtain the second bit sequence further comprises:
    determining, by the transmit end, an initial bit of the second bit sequence based on the beam indication information; and
    performing, by the transmit end, rate matching on the first bit sequence based on the initial bit of the second bit sequence, to determine the second bit sequence.

3. The method according to claim 1, wherein the beam indication information comprises at least one of:
    a relative number of a beam, a logical number of the beam, a physical number of the beam, a port number, quasi co-location (QCL) information, beam pair link information, a terminal device group, and a time-domain symbol corresponding to the beam, wherein terminal devices corresponding to each beam are a terminal device group.

4. The method according to claim 1, further comprising:
    sending the beam indication information to the receive end through radio resource control (RRC) signaling, medium access control (MAC) signaling, downlink control information (DCI), or uplink control information (UCI), wherein the receive end is a terminal device or a base station.

5. An information transmission method, comprising:
    receiving, by a receive end, a first signal that is sent from a transmit end by using a first beam;
    demodulating, by the receive end, the first signal, to obtain a second bit sequence;
    performing, by the receive end, rate de-matching on the second bit sequence based on beam indication information associated with the first beam;
    receiving, by the receive end, a second signal that is sent from the transmit end by using a second beam;
    demodulating, by the receive end, the second signal, to obtain a third bit sequence;
    performing, by the receive end, rate de-matching on the third bit sequence based on beam indication information associated with the second beam;
    performing, by the receive end, soft combination on a bit sequence obtained by performing rate de-matching on the second bit sequence, and a bit sequence obtained by performing rate de-matching on the third bit sequence; and
    performing channel decoding on a bit sequence obtained after the soft combination.

6. The method according to claim 5, wherein the performing rate de-matching on the second bit sequence based on the beam indication information associated with the first beam comprises:
    determining, by the receive end, an initial bit of the second bit sequence based on the beam indication information associated with the first beam; and
    performing, by the receive end, rate de-matching on the second bit sequence based on the initial bit of the second bit sequence.

7. The method according to claim 5, wherein the beam indication information comprises at least one of:
    a relative number of a beam, a logical number of the beam, a physical number of the beam, a port number, quasi co-location (QCL) information, beam pair link information, a terminal device group, and a time-domain symbol corresponding to the beam, wherein terminal devices corresponding to each beam are a terminal device group.

8. The method according to claim 5, further comprising:
    receiving the beam indication information through radio resource control (RRC) signaling, medium access control (MAC) signaling, downlink control information (DCI), or uplink control information (UCI).

9. An information transmission apparatus comprising:
one or more memories configured to store instructions; and
one or more processors coupled to the one or more memories and configured to execute the instructions to configure the apparatus to:
perform rate matching on a first bit sequence based on beam indication information, to obtain a second bit sequence, wherein the first bit sequence is a bit sequence obtained by performing channel coding on an original data bit;
map the second bit sequence onto a time-frequency resource; and
send, to a receive end by using a beam indicated by the beam indication information, the second bit sequence that is mapped onto the time-frequency resource,
wherein the one or more processors are further configured to execute the instructions to configure the apparatus to:
obtain the second bit sequence according to a formula $e_k = w_{(j+k_0) \mod K_w}$, wherein $e_k$ represents the $k^{th}$ element in the second bit sequence, k is an integer, $w_{(j+k_0) \mod K_w}$ represents the $(j+k_0) \mod K_w{}^{th}$ element in the first bit sequence, k is in one-to-one correspondence with j, $k_0$ represents a value related to the beam indication information, and Kw represents a length of the first bit sequence.

10. The apparatus according to claim 9, wherein the one or more processors are further configured to execute the instructions to configure the apparatus to:
determine an initial bit of the second bit sequence based on the beam indication information; and
perform rate matching on the first bit sequence based on the initial bit of the second bit sequence, to determine the second bit sequence.

11. The apparatus according to claim 9, wherein the beam indication information comprises at least one of:
a relative number of a beam, a logical number of the beam, a physical number of the beam, a port number, quasi co-location (QCL) information, beam pair link information, a terminal device group, and a time-domain symbol corresponding to the beam, wherein terminal devices corresponding to each beam are a terminal device group.

12. The apparatus according to claim 9, wherein the one or more processors are further configured to execute the instructions to configure the apparatus to:
send the beam indication information to the receive end through radio resource control (RRC) signaling, medium access control (MAC) signaling, downlink control information (DCI), or uplink control information (UCI).

13. An information transmission apparatus, wherein the apparatus comprises:
one or more memories configured to store instructions; and
one or more processors coupled to the one or more memories and configured to execute the instructions to configure the apparatus to:
receive a first signal that is sent from a transmit end by using a first beam;
demodulate the first signal, to obtain a second bit sequence; and
perform rate de-matching on the second bit sequence based on beam indication information associated with the first beam;
receive a second signal that is sent from the transmit end by using a second beam;
demodulate the second signal, to obtain a third bit sequence;
perform rate de-matching on the third bit sequence based on beam indication information associated with the second beam;
perform soft combination on a bit sequence obtained by performing rate de-matching on the second bit sequence, and a bit sequence obtained by performing rate de-matching on the third bit sequence; and
perform channel decoding on a bit sequence obtained after the soft combination.

14. The apparatus according to claim 13, wherein the one or more processors are further configured to execute the instructions to configure the apparatus to:
determine an initial bit of the second bit sequence based on the beam indication information associated with the first beam; and
perform rate de-matching on the second bit sequence based on the initial bit of the second bit sequence.

15. The apparatus according to claim 13, wherein the beam indication information comprises at least one of:
a relative number of a beam, a logical number of the beam, a physical number of the beam, a port number, quasi co-location (QCL) information, beam pair link information, a terminal device group, and a time-domain symbol corresponding to the beam, wherein terminal devices corresponding to each beam are a terminal device group.

16. The apparatus according to claim 13, wherein the one or more processors are further configured to execute the instructions to configure the apparatus to:
receive the beam indication information through radio resource control (RRC) signaling, medium access control (MAC) signaling, or downlink control information (DCI).

* * * * *